(12) United States Patent
Imade

(10) Patent No.: US 7,210,815 B2
(45) Date of Patent: May 1, 2007

(54) OPTICAL DEVICE, ILLUMINATION APPARATUS, AND COLOR ILLUMINATION APPARATUS

(75) Inventor: Shinichi Imade, Iruma (JP)

(73) Assignee: Olympus Corporation, Tokyo (JP)

( * ) Notice: Subject to any disclaimer, the term of this patent is extended or adjusted under 35 U.S.C. 154(b) by 216 days.

(21) Appl. No.: 10/885,343

(22) Filed: Jul. 6, 2004

(65) Prior Publication Data
US 2005/0002110 A1    Jan. 6, 2005

(30) Foreign Application Priority Data
Jul. 3, 2003   (JP)   ............... 2003-191300
May 27, 2004  (JP)   ............... 2004-157936

(51) Int. Cl.
*F21V 33/00* (2006.01)
(52) U.S. Cl. .................. 362/234; 362/560; 359/640
(58) Field of Classification Search ............... 362/234, 362/583, 555, 560, 612, 610, 231, 213, 554, 362/293, 294; 359/599, 618, 634, 640
See application file for complete search history.

(56) References Cited

U.S. PATENT DOCUMENTS

| 4,256,368 A | * | 3/1981 | Task ........................ 359/501 |
| 4,454,570 A | * | 6/1984 | Morello ................... 362/231 |
| 4,488,207 A | * | 12/1984 | Harmon .................. 362/231 |
| 5,061,872 A | * | 10/1991 | Kulka ...................... 313/111 |
| 5,067,799 A |   | 11/1991 | Gold et al. |
| 5,654,775 A |   | 8/1997 | Brennesholtz |
| 5,914,817 A | * | 6/1999 | Browning et al. .......... 359/634 |
| 6,227,669 B1 |   | 5/2001 | Tiao et al. |
| 6,249,387 B1 | * | 6/2001 | Poradish et al. ............ 359/634 |
| 6,318,863 B1 | * | 11/2001 | Tiao et al. |
| 6,469,755 B1 |   | 10/2002 | Adachi et al. |
| 6,556,533 B1 | * | 4/2003 | Fukakusa et al. ...... 369/112.19 |
| 6,857,761 B2 | * | 2/2005 | Chang ....................... 362/234 |
| 2002/0071274 A1 | * | 6/2002 | Chuang ..................... 362/237 |
| 2003/0219207 A1 | * | 11/2003 | Guy .......................... 385/49 |

FOREIGN PATENT DOCUMENTS

| JP | 08251609 | 9/1996 |
| JP | 11-32278 | 2/1999 |
| JP | 2000075407 | 3/2000 |
| JP | 2000181376 | 6/2000 |
| JP | 2000250136 | 9/2000 |
| JP | 2000338601 | 12/2000 |

* cited by examiner

*Primary Examiner*—Renee Luebke
*Assistant Examiner*—Evan Dzierzynski
(74) *Attorney, Agent, or Firm*—Volpe & Koenig P.C.

(57) ABSTRACT

An optical device with a first incidence plane configured to enter rays coming from a first direction, a second incidence plane configured to enter rays coming from a second direction different from the first direction, the rays which entered the first incidence plane being reflected by the second incidence plane, the rays which entered the second incidence plane being reflected by the first incidence plane, and an emission plane configured to mix the rays reflected by the first and second incidence planes and to emit the mixed rays in a predetermined direction different from the first and second directions.

6 Claims, 19 Drawing Sheets

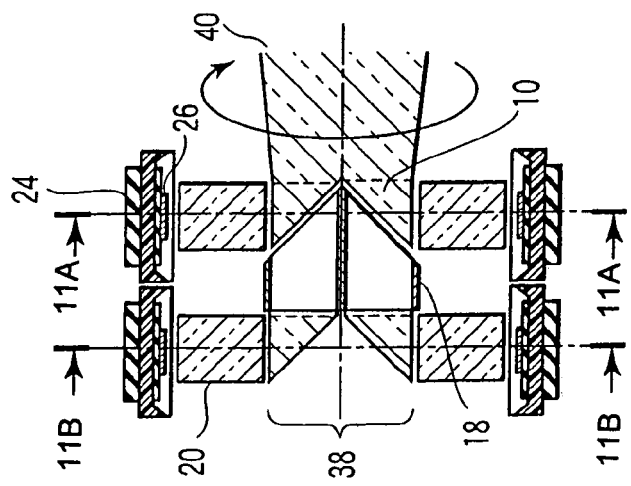
FIG. 11
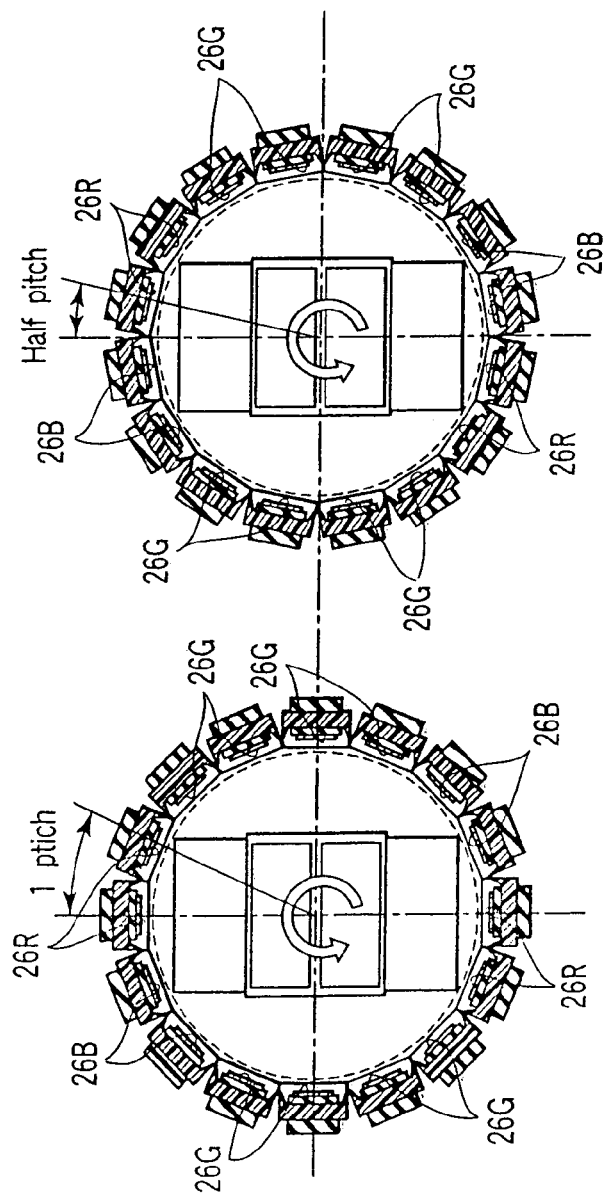
FIG. 11A
FIG. 11B

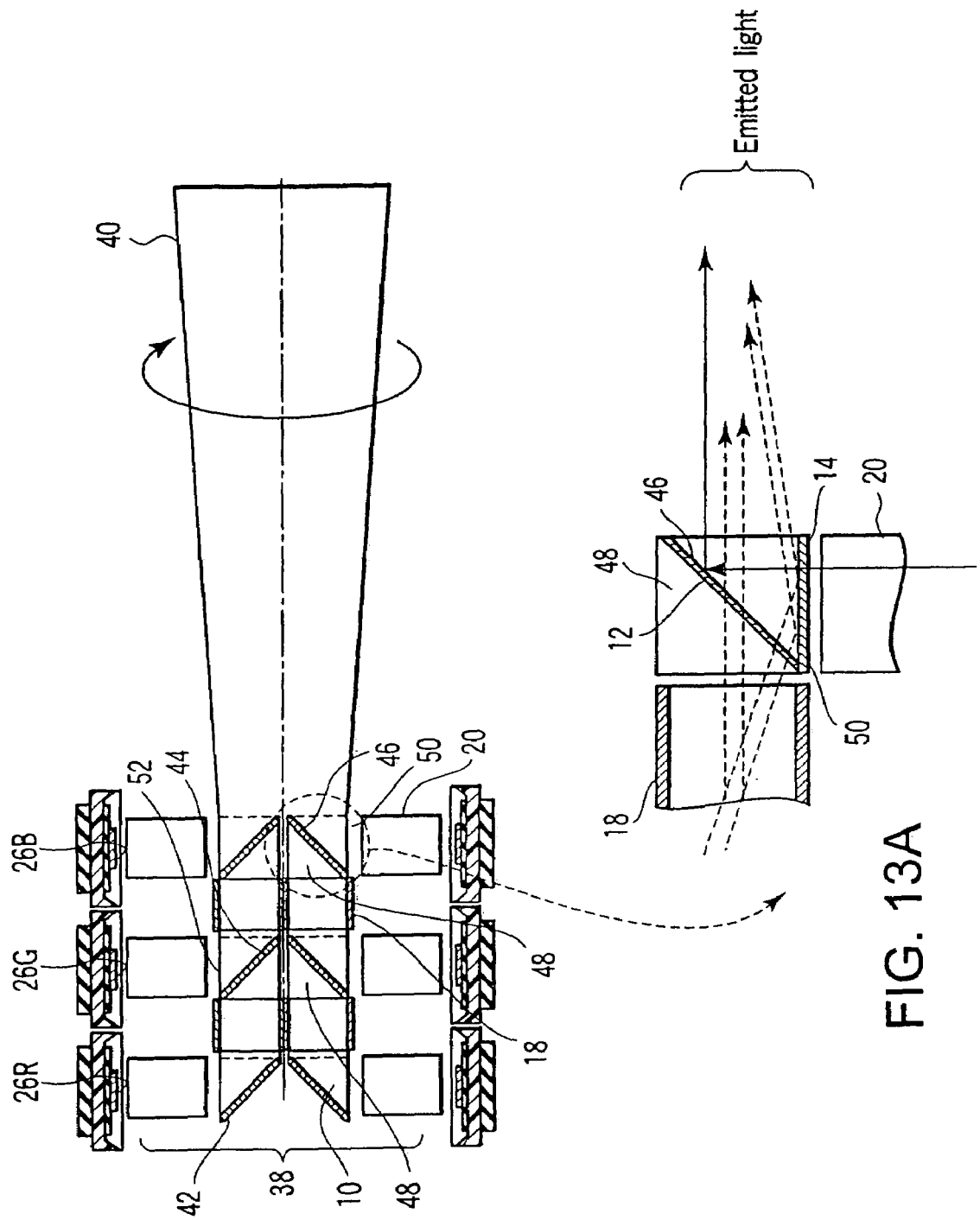

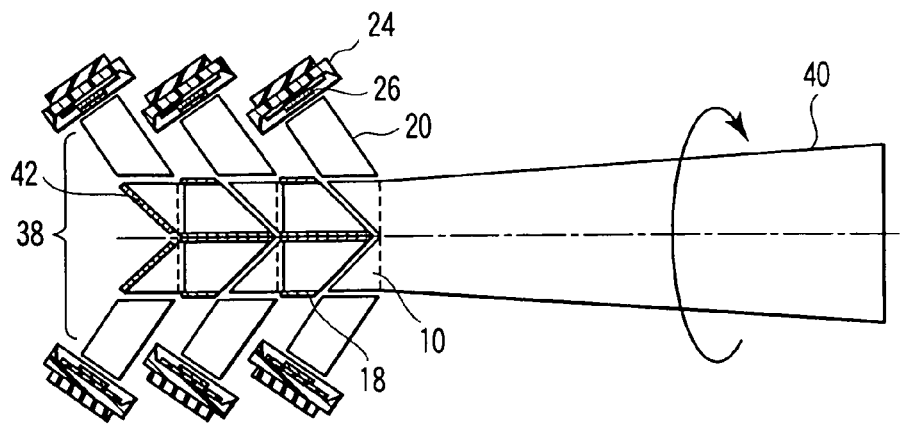
F I G. 1 4
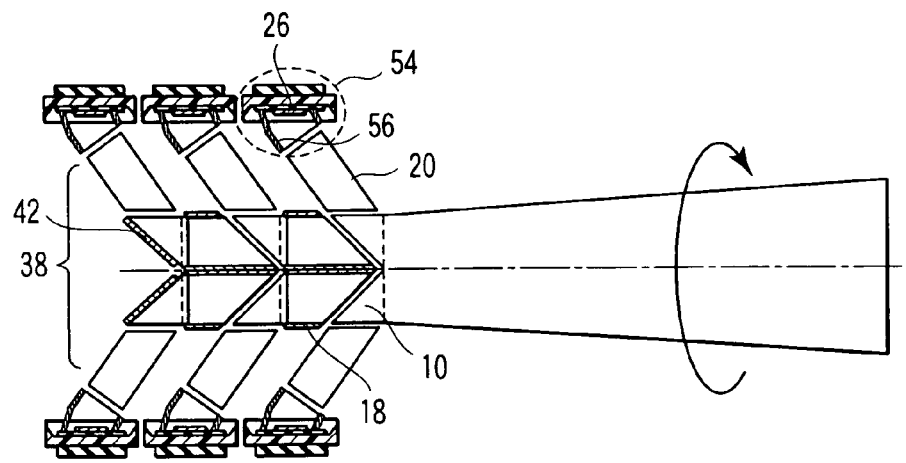
F I G. 1 5
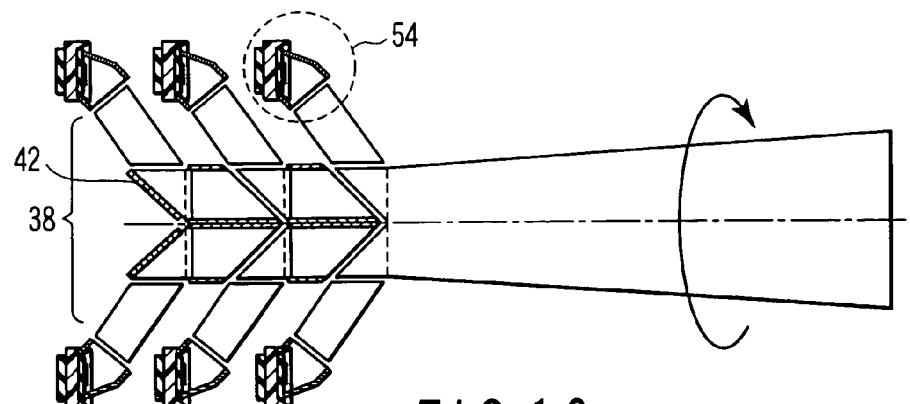
F I G. 1 6

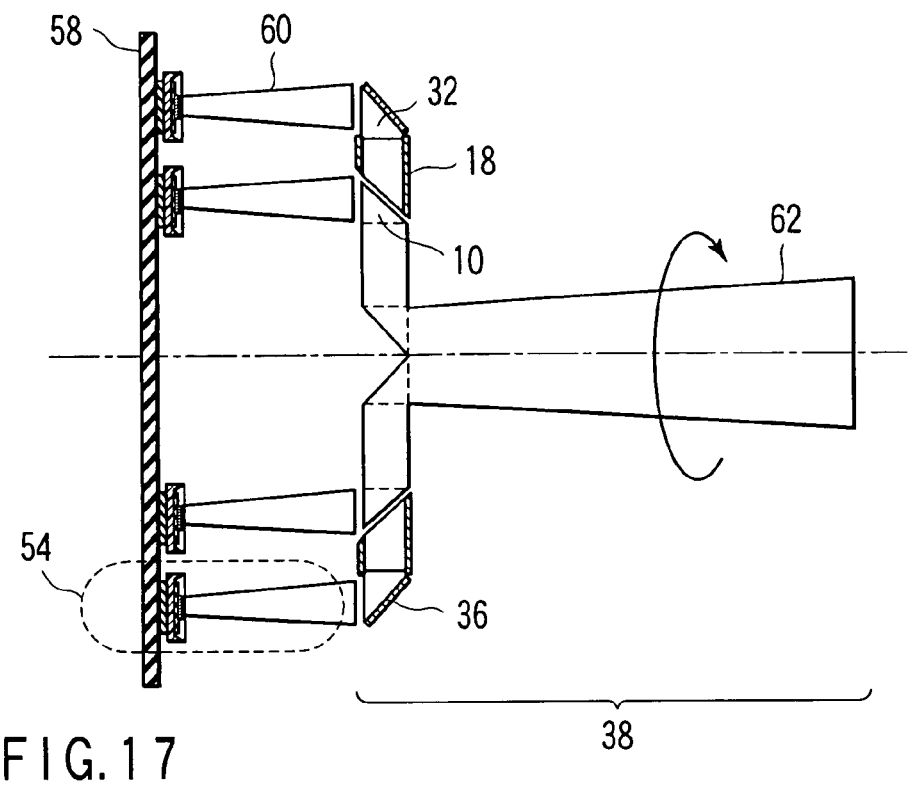
F I G. 17
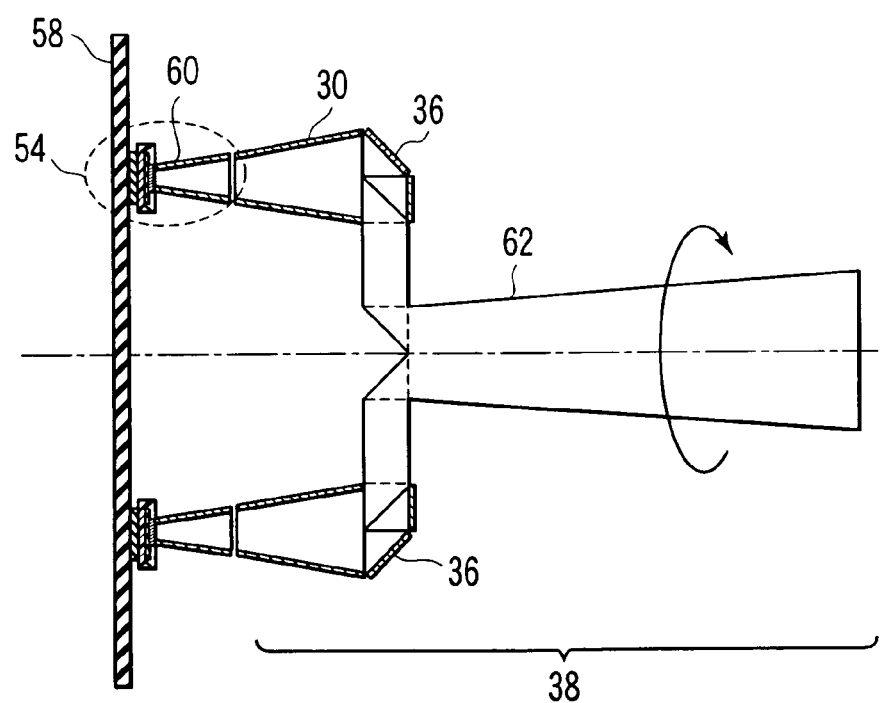
F I G. 18

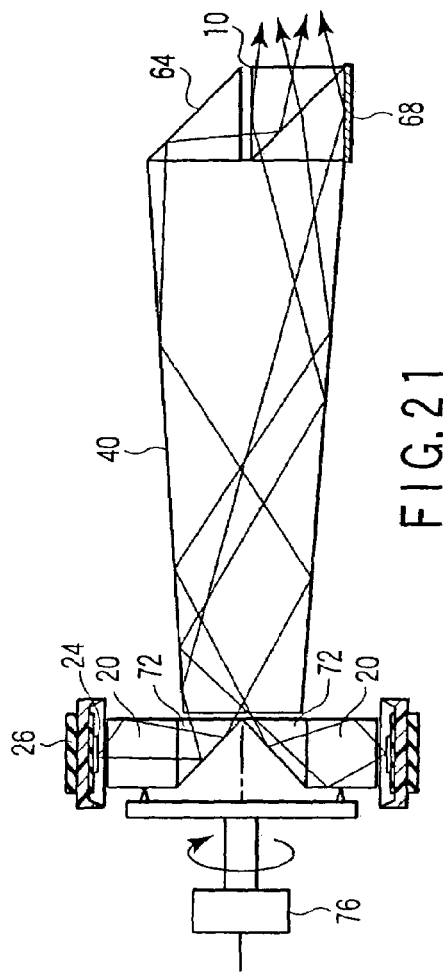
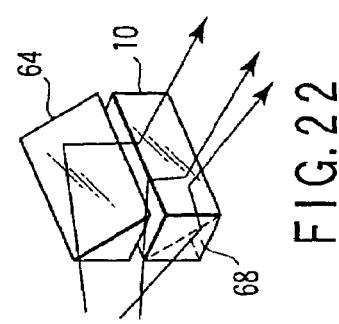
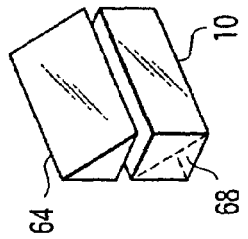
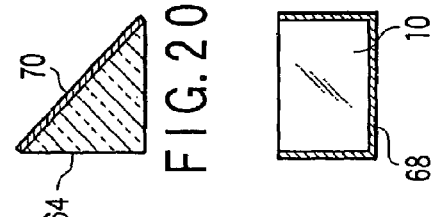
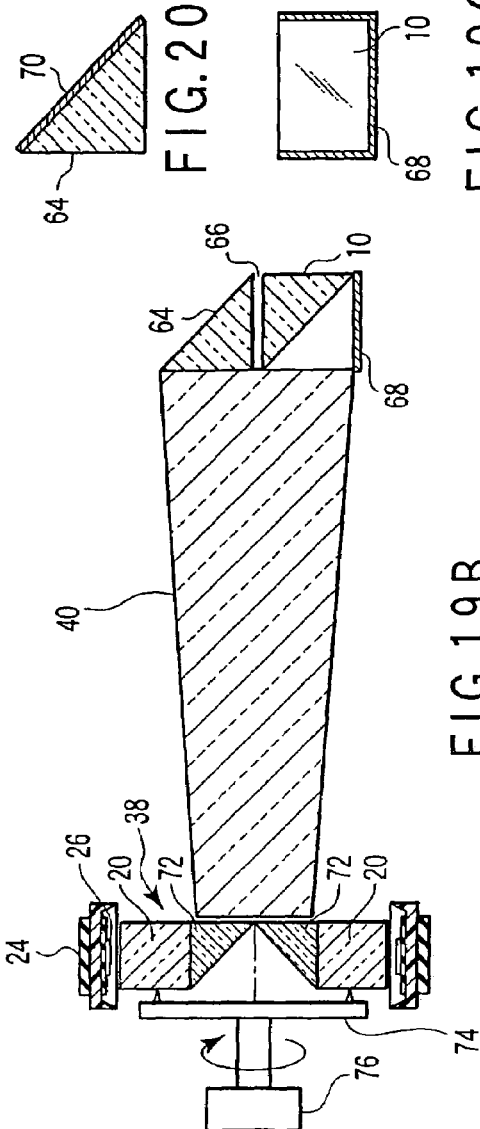
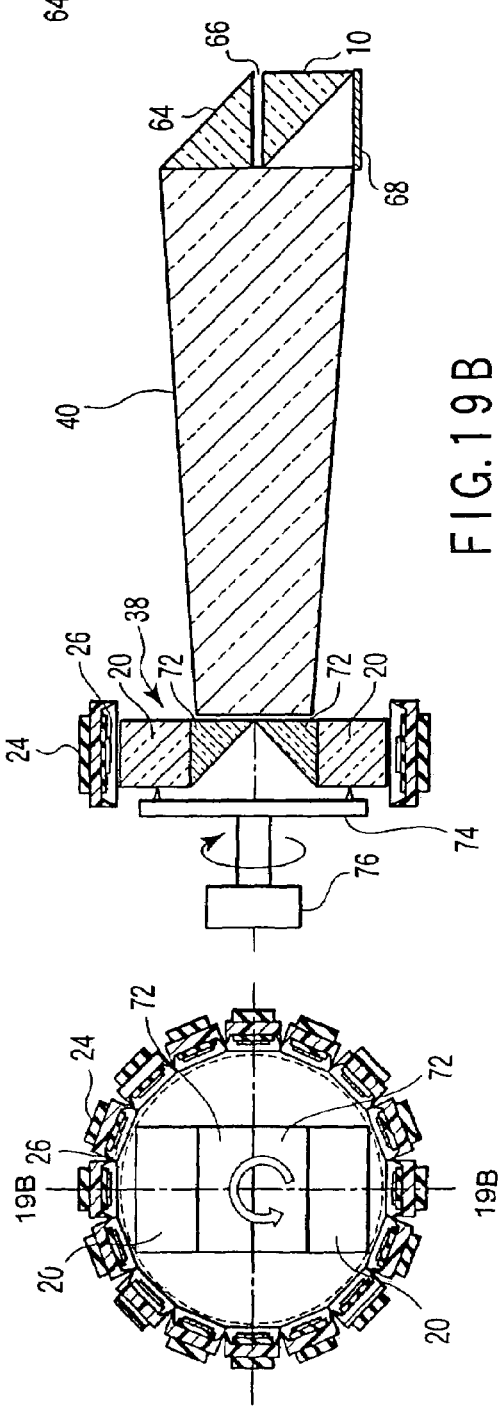

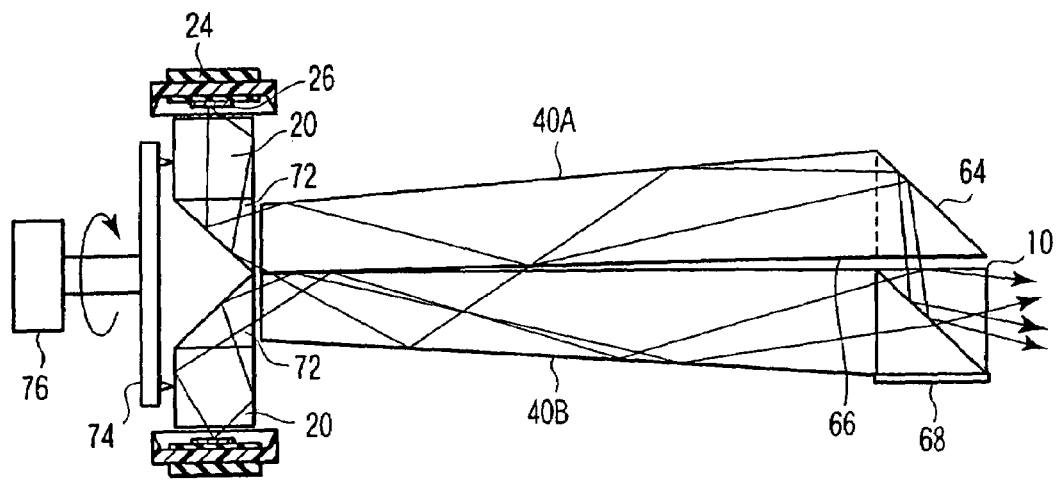
FIG. 23
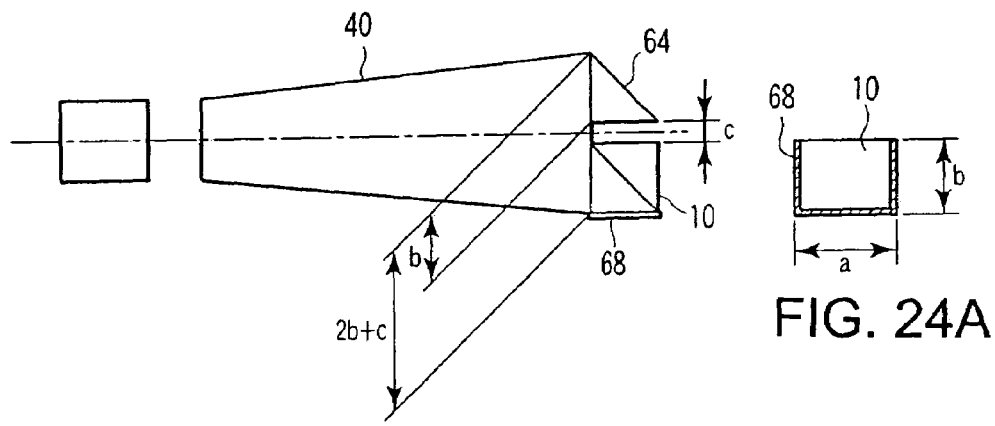
FIG. 24
FIG. 24A
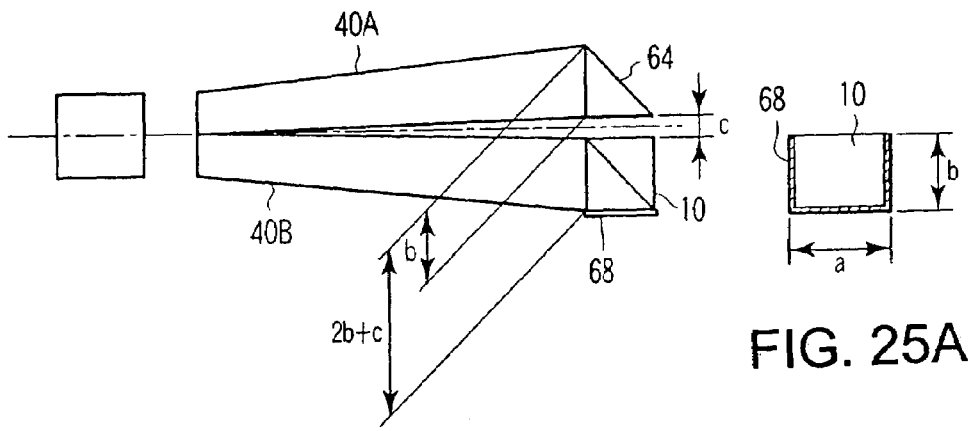
FIG. 25
FIG. 25A

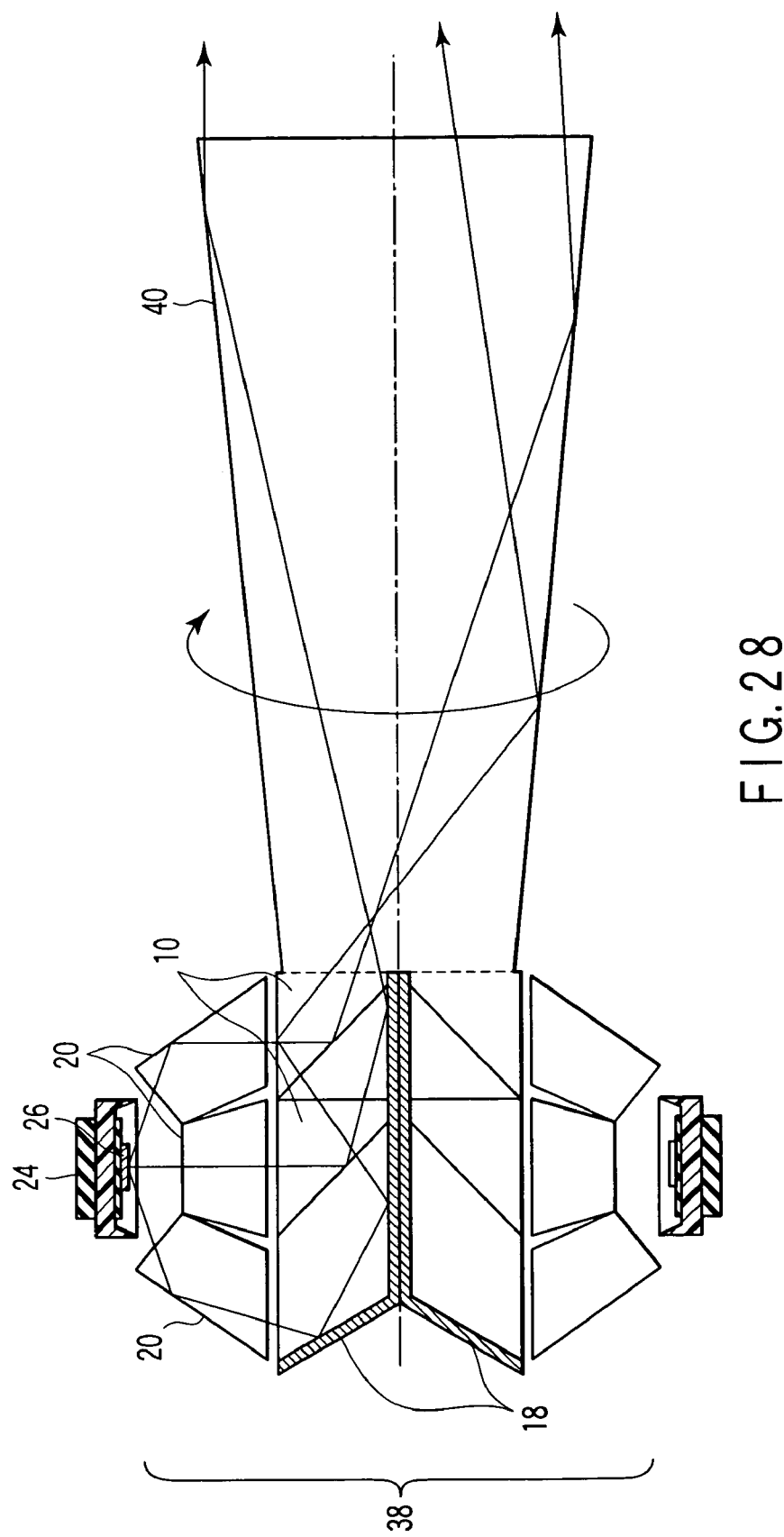
F I G. 2 8

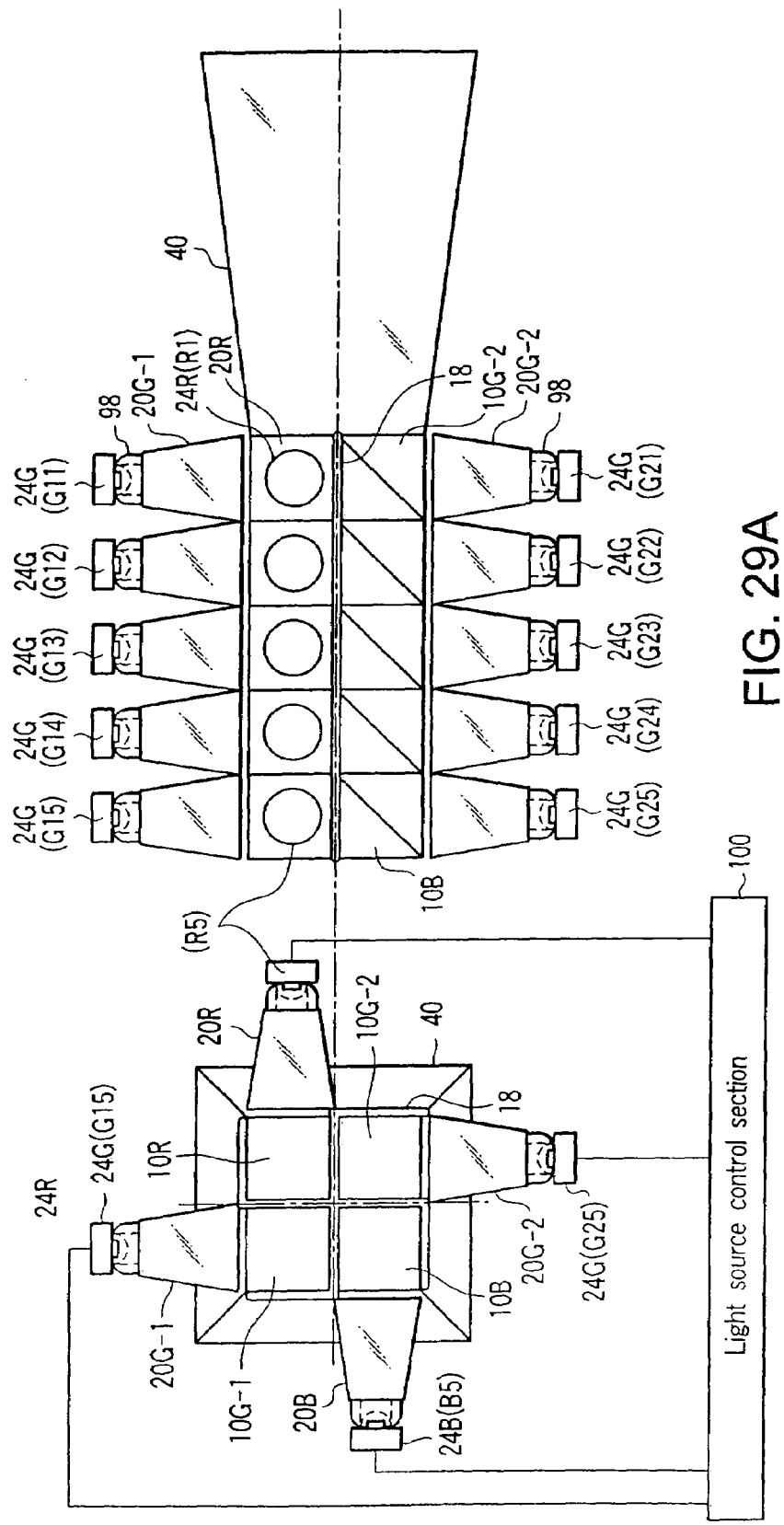

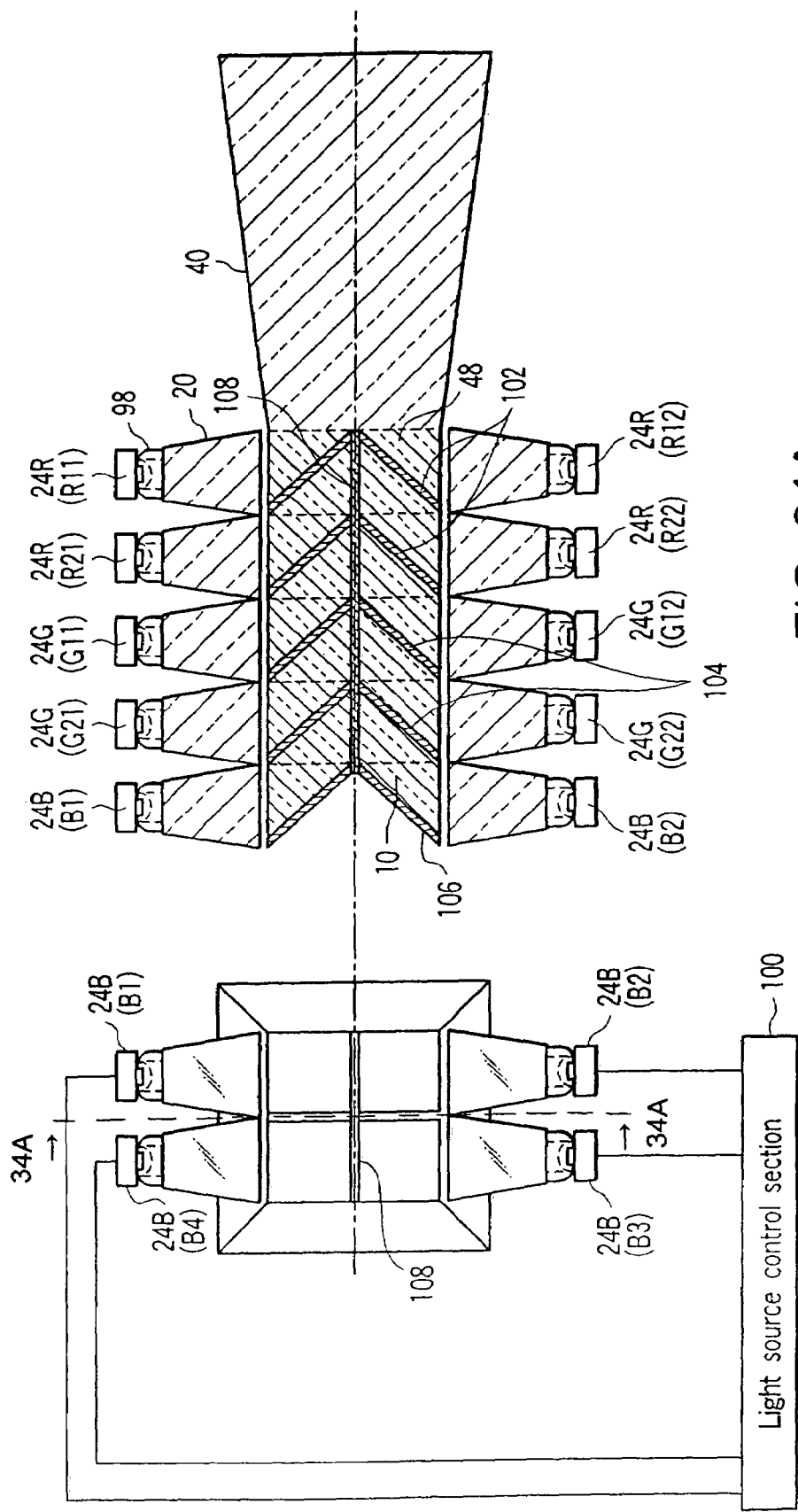

OPTICAL DEVICE, ILLUMINATION APPARATUS, AND COLOR ILLUMINATION APPARATUS

CROSS-REFERENCE TO RELATED APPLICATIONS

This application is based upon and claims the benefit of priority from prior Japanese Patent Applications No. 2003-191300, filed Jul. 3, 2003; and No. 2004-157936, filed May 27, 2004, the entire contents of both of which are incorporated herein by reference.

BACKGROUND OF THE INVENTION

1. Field of the Invention

The present invention relates to an optical device in which the light-condensing performance thereof is high and which is high-intensity and compact, and to an illumination apparatus and a color illumination apparatus using such an optical device.

2. Description of the Related Art

Conventionally, as a light-condensing illumination apparatus efficiently illuminating a specific place, for example, a vehicle headlamp, a floodlight, a spotlight, a flashlight, an illumination unit for a data projector, and the like have been known. In the light-condensing illumination apparatus, generally, an attempt is made to effectively carry out condensing illumination by a relatively simple method in which a light-emitting source which is relatively more similar to a point light source is reflected by a reflecting unit in which the reflecting shape thereof is contrived, and the directivity of luminous flux of the reflected light is improved by an optical lens or the like.

In the same way as in the general illumination, in these light-condensing illumination apparatuses as well, the demand that a size of the apparatus itself is not especially made large, and the light-condensing performance is improved, and an attempt is made to obtain even brighter illumination light is high. However, generally, there is the trend that the size of the light-condensing illumination apparatus is made large in order to obtain the even brighter illumination light. In particular, output power is enhanced due to applied electric power of a light-emitting source being made large, or a reflecting unit or an optical lens which is relatively enlarged is applied to the light-emitting source in order to improve the light-condensing performance thereof. Accordingly, in order to obtain brightness at a high light-condensing efficiency, the size of the illumination apparatus must be necessarily larger with respect to the light-emitting source. In other words, provided that there is a compact light-emitting source which outputs high power and which is similar to a point light source, the entire illumination apparatus can be made compact. In accordance with such a demand, making a conventional system light-emitting source compact has been developed, and in particular, an electric-discharging type compact light-emitting source which can output high power is presently advantageous means. However, there are a large number of problems such that even a compact electric-discharging type light-emitting source requires to be driven by a high voltage power supply in which it is difficult to make the circuit dimensions small, or the like, for making an entire illumination apparatus compact, and it is said that the method in which an entire illumination apparatus is made compact substantially realize limit.

On the other hand, as the next-generation compact light-emitting source, a light emitting diode (hereinafter, referred to as LED) has been recently markedly focused on. Up to the present, although the LED has merits such as a compactness, high resistance, a long life, or the like, the major applications are for using as a indicator illumination for various meters and a confirming lamp in a control state due to the limitations of the light-emitting efficiency and the light-emitting output. However, in recent years, the light-emitting efficiency has been being rapidly improved, and it has been said that the light-emitting efficiency of the LED exceeds the light-emitting efficiency of an electric-discharging type high-pressure mercury lamp and a fluorescent lamp which have been conventionally considered as the highest efficiency, is only a question of time. In accordance with an appearance of the high-efficiency and high-intensity LED, a high power light-emitting source by the LED has been rapidly close to be realized. Further, the application of the LED has been accelerated by the fact that the stage of practical use for the blue LED in addition to the conventional red and green LEDs is recently achieved. In reality, due to the plurality of high-efficiency and high-intensity LEDs being used, putting the LEDs to practical use for traffic lights, an outdoor type large full color display, various lamps of an automobile, a back light of liquid-crystal display of a cellular phone, has been started.

As a promising compact light-emitting source of an illumination apparatus for which light-condensing performance is required as well, it is considered that the high-efficiency and high-intensity LED is applied. The LED originally has characteristics superior than the other light-emitting sources in the points of a life, durability, a lighting speed, simplicity of a lighting driving circuit. In particular, the applicable range as a full color image display apparatus is enlarged due to three primary colors being completed as a light-emitting source emitting light by itself due to blue color being added. As a typical example of the illumination apparatus for which light-condensing performance is required, for example, there is a projector display apparatus (image projection apparatus) in which a display image is formed from image data, and the display image is projected. In a conventional image projector apparatus, desired primary colors are separated from a white system light-emitting source by a color filter or the like, and space light modulation is applied to image data corresponding to each color, and color image display has been able to be realized due to the image data being three-dimensionally and temporally synthesized. When the white system light-emitting source is used, because only one desired color is separated and used, there are a large number of cases in which colors other than the separated color are wastefully thrown away. In this point, because the LED emits the desired light itself, it is possible to emit a required quantity of light as needed, and it is possible to efficiently utilize the light of the light-emitting source without light being wasted as compared with the case of the conventional white system light-emitting source.

Focusing on such superior applicable conditions of the LED, examples in which the LED is applied to an illumination apparatus for an image projection apparatus are disclosed in, for example, Jpn. Pat. Appln. KOKAI Publication No. 11-32278, U.S. Pat. No. 6,227,669B1, U.S. Pat. No. 6,318,863, or the like. In the technique disclosed in these publications, a certain quantity of light is insured by structuring a plurality of LEDs, and some of luminous flux from the individual light-emitting sources are condensed by an optical element such as an optical lens or the like, and the luminous flux is controlled so as to be successfully within an incident angle allowed by a light-modulating element irradiating the light. In an optical modulating element such as a liquid crystal device which is generally and broadly used, because an incident angle allowed as illumination light is extremely small, it is considered as an ideal, not only to have mere light-condensing performance, but also to form a luminous flux having a higher parallelism and irradiate the luminous flux. This is markedly important point from the standpoint in which efficiency for light utilization in an optical modulating element is improved.

BRIEF SUMMARY OF THE INVENTION

According to a first aspect of the present invention, there is provided an optical device comprising:
  a first incidence plane configured to enter rays coming from a first direction;
  a second incidence plane configured to enter rays coming from a second direction different from the first direction, the rays which entered the first incidence plane being reflected by the second incidence plane, the rays which entered the second incidence plane being reflected by the first incidence plane; and
  an emission plane configured to mix the rays reflected by the first and second incidence planes and to emit the mixed rays in a predetermined direction different from the first and second directions.

According to a second aspect of the present invention, there is provided an illumination apparatus comprising:
  a first light source configured to emit a diffused light;
  a second light source configured to emit a diffused light;
  a first incidence plane configured to enter rays emitted from the first light source;
  a second incidence plane configured to enter rays emitted from the second light source, the rays which entered the first incidence plane being reflected by the second incidence plane, the rays which entered the second incidence plane being reflected by the first incidence plane; and
  an emission plane configured to mix the rays reflected by the first and second incidence planes and to emit the mixed rays in a predetermined direction.

According to a third aspect of the present invention, there is provided a color illumination apparatus comprising:
  a plurality of illumination apparatuses each including:
  a first light source configured to emit a diffused light;
  a second light source configured to emit a diffused light;
  a first incidence plane configured to enter rays emitted from the first light source;
  a second incidence plane configured to enter rays emitted from the second light source, the rays which entered the first incidence plane being reflected by the second incidence plane, the rays which entered the second incidence plane being reflected by the first incidence plane; and
  an emission plane configured to mix the rays reflected by the first and second incidence planes and to emit the mixed rays in a predetermined direction; and
  a light source control section configured to drive and control the first and second light sources of the plurality of illumination apparatuses,
  wherein the first and second light sources configuring one of the plurality of illumination apparatuses emit a diffused light of a first color which is the same color,
  the first and second light sources configuring the other illumination apparatus in the plurality of illumination apparatuses emit a diffused light of a second color which is the same color, the second color being different from the first color, and the light source control section drives and controls the first and second light sources configuring the one illumination apparatus and the other illumination apparatus in such a manner that the color of the color illuminative light is switched to the first and second colors in a time series.

According to a fourth aspect of the present invention, there is provided an illumination apparatus comprising:
  a light-source configured to emit rays;
  a luminous flux splitting member configured to split the rays emitted from the light source into two luminous fluxes; and
  an optical device including:
  a first incidence plane configured to enter rays of the first luminous flux split by the luminous flux splitting member;
  a second incidence plane configured to enter rays of the second luminous flux split by the luminous flux splitting member, the rays which entered the first incidence plane being reflected by the second incidence plane, the rays which entered the second incidence plane being reflected by the first incidence plane; and
  an emission plane configured to mix the rays reflected by the first and second incidence planes and to emit the mixed rays in a predetermined direction.

According to a fifth aspect of the present invention, there is provided an optical device comprising:
  a first incidence plane for entering rays coming from a first direction;
  a second incidence plane for entering rays coming from a second direction different from the first direction, the rays which entered the first incidence plane being reflected by the second incidence plane, the rays which entered the second incidence plane being reflected by the first incidence plane; and
  an emission plane for mixing the rays reflected by the first and second incidence planes and for emitting the mixed rays in a predetermined direction different from the first and second directions.

According to a sixth aspect of the present invention, there is provided an illumination apparatus comprising:
  first light source means for emitting a diffused light;
  second light source means for emitting a diffused light;
  a first incidence plane for entering rays emitted from the first light source means;
  a second incidence plane for entering rays emitted from the second light source means, the rays which entered the first incidence plane being reflected by the second incidence plane, the rays which entered the second incidence plane being reflected by the first incidence plane; and
  an emission plane for mixing the rays reflected by the first and second incidence planes and for emitting in a predetermined direction.

According to a seventh aspect of the present invention, there is provided a color illumination apparatus comprising:
  a plurality of illumination apparatuses each including:
    first light source means for emitting a diffused light;
    second light source means for emitting a diffused light;
    a first incidence plane for entering rays emitted from the first light source means;
    a second incidence plane for entering rays emitted from the second light source means, the rays which entered the first incidence plane being reflected by the second incidence plane, the rays which entered the second incidence plane being reflected by the first incidence plane; and an emission plane for mixing the rays reflected by the first and second incidence planes and for emitting the mixed rays in a predetermined direction; and light source control means for driving and controlling the first and second light source means of the plurality of illumination apparatuses, wherein the first and second light source means configuring one of the plurality of illumination apparatuses emit a diffused light of a first color which is the same color, the first and second light source means configuring the other illumination apparatus in the plurality of illumination apparatuses emit a diffused light of a second color which is the same color, the second color being different from the first color, and the light source control means drives and controls the first and second light source means configuring the one illumination apparatus and the other illumination apparatus in such a manner that the color of the color illuminative light is switched to the first and second colors in a time series.

According to an eighth aspect of the present invention, there is provided an illumination apparatus comprising:

light source means for emitting rays;

luminous flux splitting means for splitting the rays emitted from the light source means into two luminous fluxes; and an optical device including:
  a first incidence plane for entering rays of the first luminous flux split by the luminous flux splitting means;
  a second incidence plane for entering rays of the second luminous flux split by the luminous flux splitting means, the rays which entered the first incidence plane being reflected by the second incidence plane, the rays which entered the second incidence plane being reflected by the first incidence plane; and
  an emission plane for mixing the rays reflected by the first and second incidence planes and for emitting the mixed rays in a predetermined direction.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a diagram showing a configuration of a modification of the illumination apparatus according to the third embodiment;

FIG. 11A is a sectional view looking in the direction of line 11A—11A in FIG. 11;

FIG. 11B is a sectional view looking in the direction of line 11B—11B in FIG. 11;

FIG. 13 is a diagram showing a configuration of still another modification of the illumination apparatus according to the third embodiment;

FIG. 13A is an enlarged view of the area shown in dashed lines in FIG. 13;

FIG. 14 is a diagram showing a configuration of another modification of the illumination apparatus according to the third embodiment;

FIG. 15 is a diagram showing a configuration of another modification of the illumination apparatus according to the third embodiment;

FIG. 16 is a diagram showing a configuration of still another modification of the illumination apparatus according to the third embodiment;

FIG. 17 is a diagram showing a configuration of the illumination apparatus according to a fourth embodiment of the present invention;

FIG. 18 is a diagram showing a configuration of a modification of the illumination apparatus according to the fourth embodiment;

FIG. 19A is a side view of the illumination apparatus according to a fifth embodiment of the present invention;

FIG. 19B is a sectional view taken along line 19B—19B of FIG. 19A;

FIG. 19C is a diagram showing an emission plane;

FIG. 19D is a perspective view of two prisms and a reflective pipe disposed on an emission end-of a tapered rod;

FIG. 20 is a diagram showing a modification of an upper prism;

FIG. 21 is a ray tracing diagram corresponding to FIG. 19B;

FIG. 22 is a ray tracing diagram corresponding to FIG. 19D;

FIG. 23 is a diagram showing a configuration of a modification of the illumination apparatus according to a fifth embodiment;

FIG. 24 is an explanatory view of a size of the emission end of the tapered rod in the illumination apparatus according to the fifth embodiment;

FIG. 24A is an explanatory view of the height and width of the prism illustrated in FIG. 24;

FIG. 25 is an explanatory view of a size of the emission end of the tapered rod in a modification of FIG. 23;

FIG. 25A is an explanatory view of the height and width of the prism illustrated in FIG. 25;

FIG. 28 is a diagram showing a configuration of the illumination apparatus according to a sixth embodiment of the present invention;

FIG. 29 is a front plan view showing a configuration of the illumination apparatus according to a seventh embodiment of the present invention;

FIG. 29A is a side plan view of the illumination apparatus of FIG. 29;

FIG. 34 is a front plan view showing a configuration of still another modification of the illumination apparatus according to the seventh embodiment;

FIG. 34A is a sectional view looking in the direction of line 34A—34A in FIG. 34.

DETAILED DESCRIPTION OF THE INVENTION

Embodiments of the present invention will be described hereinafter with reference to the drawings.

[First Embodiment]

Figure 1:
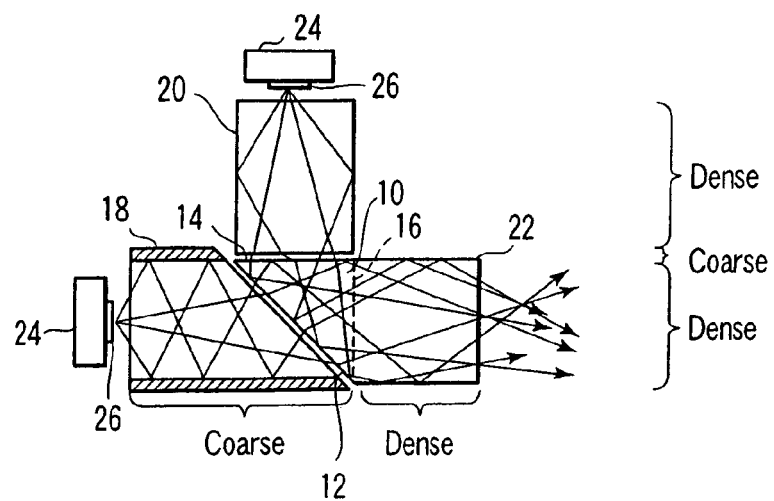
FIG. 1 is a diagram showing a configuration of an optical device according to a first embodiment of the present invention.

As shown in FIG. 1, an optical device according to a first embodiment of the present invention includes a prism 10 including: a first incidence plane 12 on which rays coming from a first direction strike; a second incidence plane 14 on which rays coming from a second direction, different from the first direction, strike; and an emission plane 16 for emitting rays incident upon the first and second incidence planes 12, 14 in a predetermined direction which is different from the first and second directions.

Figure 2:
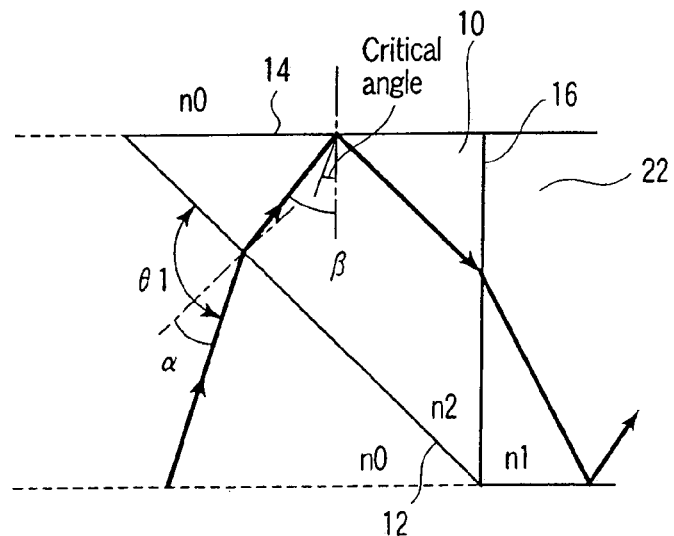
FIG. 2 is an explanatory view of reflection on a second incidence plane with respect to light incident upon a first incidence plane.

Moreover, the optical device includes: a hollow light pipe 18 including a reflective surface on its inner surface, which is a light guiding member for guiding the rays coming from the first direction onto the first incidence plane 12; and a solid rod 20 which is a light guiding member for guiding the rays coming from the second direction onto the second incidence plane 14. In this case, emission ports of the light pipe 18 and rod 20 are aligned/arranged with respect to the first or second incidence plane with a small interval from the prism 10 by a holding member (not shown). It is to be noted that the emission plane 16 of the prism 10 is connected to a solid rod 22. LED packages 24 are disposed as light sources on the side of incidence ports of the light pipe 18 and rod 20, in which LED light-emitting chips 26 including light emitting surfaces for emitting diffused light are sealed In FIG. 1, "dense" and "coarse" indicate refractive indexes. That is, as shown in FIG. 2, gaps between the prism 10, and the inner surface of the hollow light pipe 18 and the rod 20 outside the first and second incidence planes 12, 14 are air layers. The air layers have a low refractive index as compared with that of mediums configuring the prism 10 and rods 20, 22. It is to be noted that the refractive index of the prism 10 is lower than that of the rod 20 or 22, but a difference between them is small. That is, assuming that the refractive index of the air layer is n0, that of the rod 20 or 22 is n1, and that of the prism 10 is n2, the following relation is achieved:

n0<<n1<n2.

Therefore, in FIG. 1, the prism 10 and rods 20, 22 are represented as "dense".

In this refractive index relation, as shown in FIG. 2, the rays emitted from the LED light-emitting chip 26 and guided by the light pipe 18, for example, the rays incident upon the first incidence plane 12 at an angle α with respect to a normal of the first incidence plane 12 of the prism 10, are refracted by the first incidence plane 12. Moreover, the rays enter the second incidence plane 14 at an angle β with respect to the normal of the second incidence plane 14. At this time, when the incident angle β exceeds a critical angle, total reflection conditions are satisfied, and the light incident upon the second incidence plane 14 is reflected by the second incidence plane 14, and emitted into the rod 22 from the emission plane 16. That is, the ray incident upon the first incidence plane 12 at an angle θ1 in FIG. 2 is refracted by the second incidence plane 14 to satisfy the total reflection conditions, reflected by the second incidence plane 14, and emitted from the emission plane 16.

Figure 3:
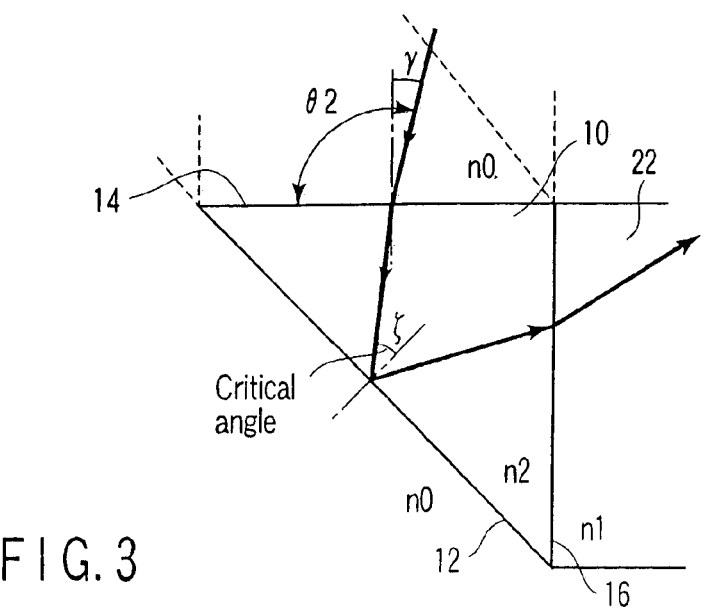
FIG. 3 is an explanatory view of reflection on the first incidence plane with respect to light incident upon the second incidence plane.

Similarly, as shown in FIG. 3, the rays emitted from the LED chip 26 and guided by the rod 20, for example, the rays incident upon the second incidence plane 14 at an angle γ with respect to a normal of the second incidence plane 14 of the prism 10, are refracted, and enter the first incidence plane 12 at an angle ζ with respect to the normal of the first incidence plane 12. At this time, when the incident angle ζ exceeds a critical angle, total reflection conditions are satisfied, and the rays are reflected by the first incidence plane 12, and emitted into the rod 22 from the emission plane 16. That is, the ray incident upon the second incidence plane 14 at an angle θ2 in FIG. 3 is refracted by the first incidence plane 12 to satisfy the total reflection conditions, reflected by the first incidence plane 12, and emitted from the emission plane 16.

In this manner, in the optical device according to the first embodiment, the ray incident upon the first incidence plane 12 is reflected by the second incidence plane 14, or the ray incident upon the second incidence plane 14 is reflected by the first incidence plane 12. The rays reflected by the first and second incidence planes are mixed, and emitted toward the rod 22 in the predetermined direction which is different from the first and second directions from the emission plane 16. Therefore, since the rays incident upon two directions can be mixed and emitted, a large quantity of light can be obtained.

Figure 4:
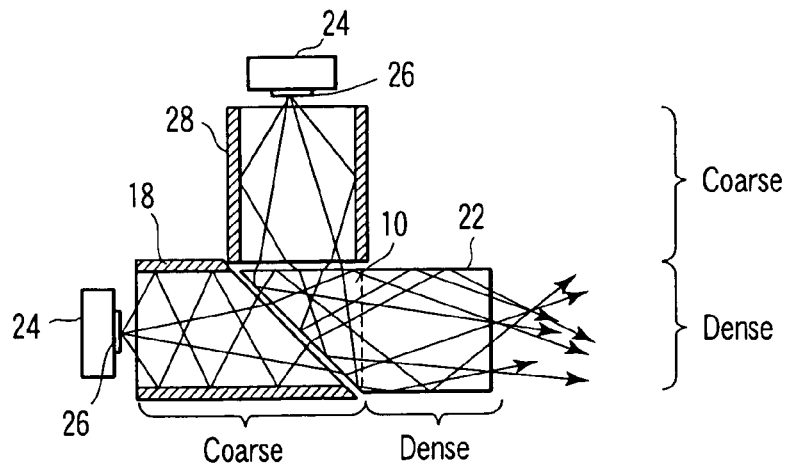
FIG. 4 is a diagram showing a configuration of a modification of an optical device according to a first embodiment.

It is to be noted that as the light guiding member for guiding the ray coming from the second direction onto the second incidence plane 14, as shown in FIG. 4, a hollow light pipe 28 including the reflective surface on its inner surface may also be used instead of the solid rod 20. Even when the light pipe 28 is used in this manner, an effect is obtained in the same manner as described above.

Figure 5:
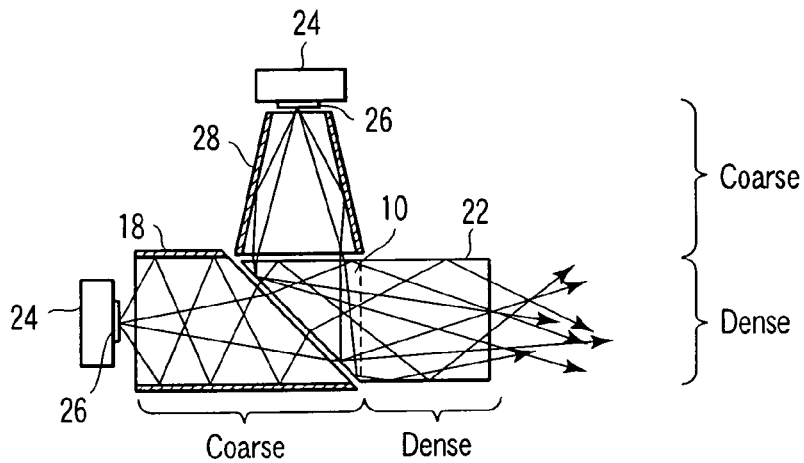
FIG. 5 is a diagram showing a configuration of another modification of the optical device according to the first embodiment.

Moreover, as shown in FIG. 5, the solid rod 20 or the hollow light pipe 28 which is the light guiding member for guiding the ray coming from the second direction onto the second incidence plane 14 may be configured in a tapered shape having an area of an emission end surface which is larger than that of an incidence end surface. The diffused light from the LED chip 26 may also be converted with a small NA. With the tapered shape, the diffused light from the LED chip 26 is converted to a substantially parallel light so that the light can enter the second incidence plane 14 of the prism 10. Therefore, the light emitted from the solid rod 20 or the hollow light pipe 28 can be brought into an range of the incident angle $\theta 2$ capable of guiding the light in accordance with the above-described total reflection conditions, and the quantity of light can further be increased.

Figure 6:
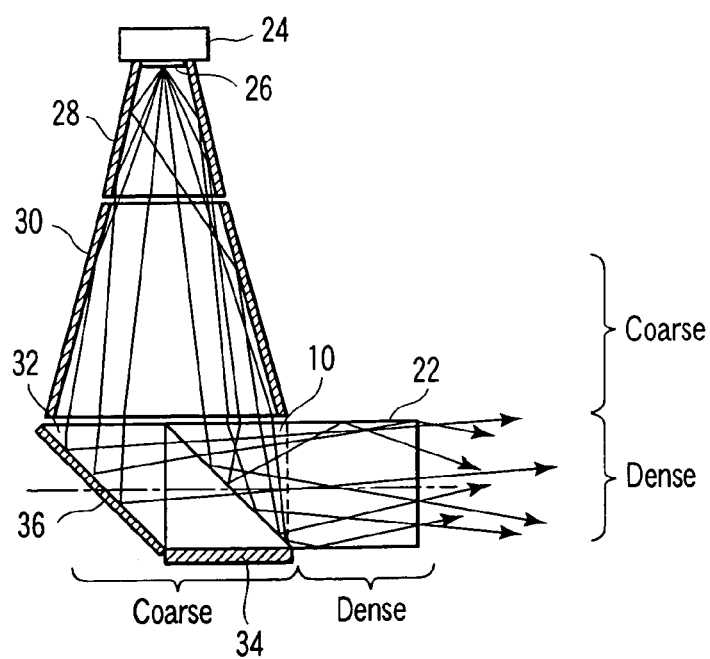
FIG. 6 is a diagram showing a configuration of still another modification of the optical device according to the first embodiment.

It is to be noted that with the tapered shape, to obtain almost the parallel light, it is necessary to increase an air ratio of the incidence end surface to the emission end surface. However, when the ratio is adjusted in accordance with a size of the incidence plane of the prism 10, the existing LED package 24 having a standard size cannot be used as the light source. To solve the problem, as shown in FIG. 6, a tapered light pipe 30 functioning as a luminous flux splitting member for splitting the ray into two luminous fluxes is disposed, for example, between the light pipe 28 and the prism 10. Moreover, another prism 32 is disposed in a region of the emission plane of the light pipe 30, which is not covered with the second incidence plane 14 of the prism 10. Furthermore, a light pipe 34 is disposed between the emission plane of the prism 32 and the first incidence plane 12 of the prism 10. In this case, the reflective surface of the prism 32 is coated with a mirror coat 36, and all the incident rays are reflected to enter the first incidence plane 12 of the prism 10 via the light pipe 34.

With this configuration, the standard LED package 24 is usable. Furthermore, one light source is usable for emitting the light which should enter the first and second incidence planes 12, 14 of the prism 10. When the light source is used in this manner the quantity of light itself decreases as compared with the use of two light sources. However, parallelism is further enhanced, while the light can enter the prism 10. Therefore, since the rays totally reflected in the prism 10 increase, a drop in the quantity of light by the use of one light source is small.

[Second Embodiment]

Figure 7:
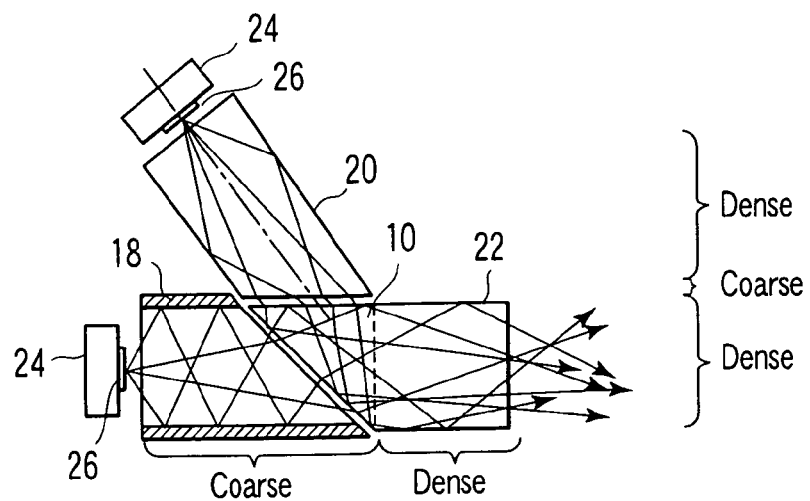
FIG. 7 is a diagram showing a configuration of the optical device according to a second embodiment of the present invention.

When the rod 20 is disposed perpendicularly to the second incidence plane 14 of the prism 10 as shown in FIG. 1, some of the rays are not in a range of an incident angle $\theta 2$ capable of guiding the light by the total reflection conditions as shown in FIG. 3, and result in a loss of quantity of light. To solve the problem, in the second embodiment, as shown in FIG. 7, an extending direction of the rod 20 is inclined with respect to the second incidence plane 14 of the prism 10. With this configuration, the ray incident upon the second incidence plane 14 of the prism 10 can be brought into the range of $\theta 2$, eventually the rays reflected by the first incidence plane 12 can be increased, and bright light is emitted from the emission plane 16.

Figure 8:
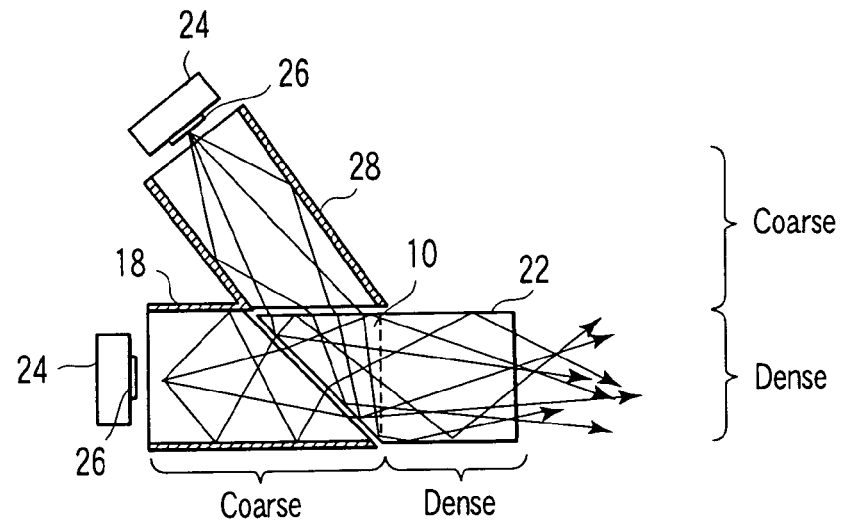
FIG. 8 is a diagram showing a configuration of a modification of the optical device according to the second embodiment.
Figure 9:
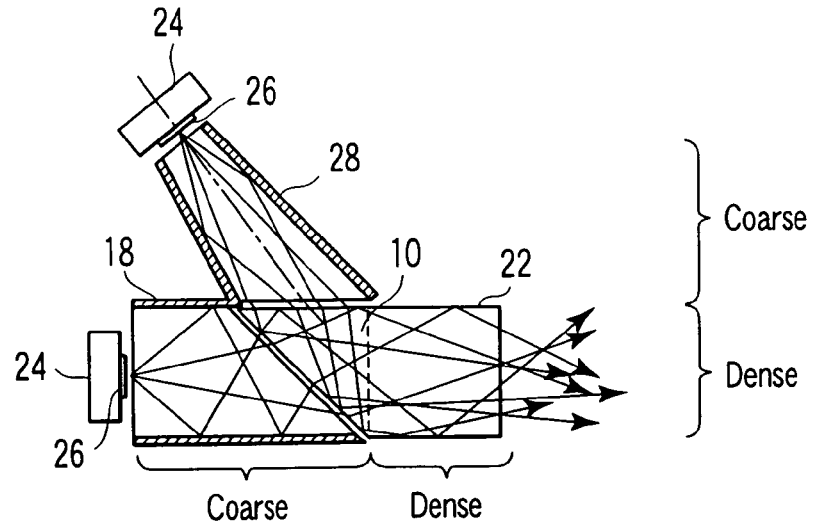
FIG. 9 is a diagram showing a configuration of another modification of the optical device according to the second embodiment.

Moreover, in the second embodiment, in the same manner as in the first embodiment, needless to say, the light pipe 28 may also be used instead of the rod 20 as shown in FIG. 8, or the rod 20 or the light pipe 28 may also be configured in a tapered shape as shown in FIG. 9.

[Third Embodiment]

The present embodiment relates to an illumination apparatus using the optical device described in the first and second embodiments.

Figures 10, 10A:
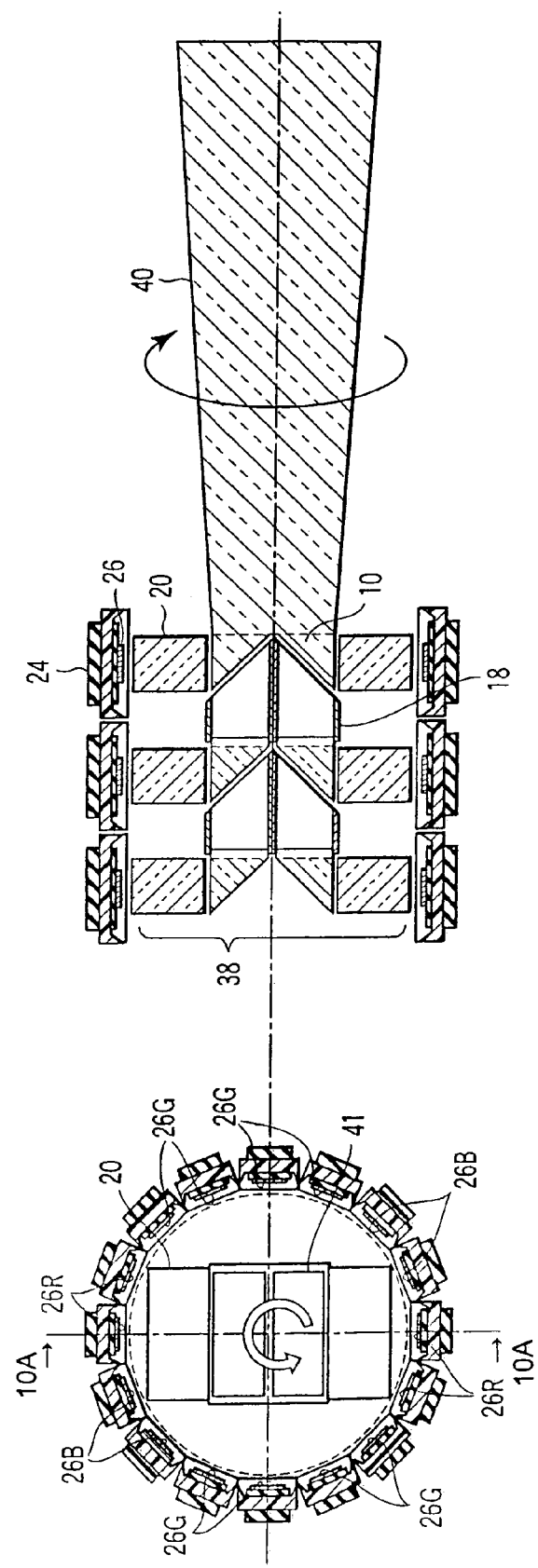
FIG. 10 is a diagram showing a configuration of an illumination apparatus according to a third embodiment of the present invention.
FIG. 10A is a sectional view looking in the direction of line 10A—10A in FIG. 10.

As shown in FIGS. 10 and 10A, LED chips 26 are mounted on inner peripheries of substrates (not shown) of three stages formed in an annular form (donut type). Here, some of the LED chips 26 have emission colors of red (R), green (G), blue (B). In the present embodiment, two LED chips (R) 26R, two LED chips (B) 26B, and four LED chips (G) 26G form one set, and two sets are disposed on the inner periphery of the annular light-emitting substrate in each of three stages. In this case, the LED chips 26 having the same emission color are disposed in positions facing each other. The chips are also configured to have the same emission color in the same position of the adjoining stages. In this case, light-emitting surfaces of the LED chips 26 in the same position of the adjoining stages are disposed to have a mutually parallel positional relation.

An integral movable part 38 is stored inside the ring. The integral movable part 38 is configured of two optical devices each including the prism 10, light pipe 18, and parallel rods 20 described with reference to FIG. 1 with respect to the LED chip 26 of the first stage in such a manner that the emission planes 16 of the prisms 10 are connected to one tapered rod 40. In this case, the rays of the LED chips 26 having the same color in the positions of the ring inner surface facing each other enter the second incidence planes 14 of the prisms 10. Furthermore, with respect to the second stage of the LED chip 26, the integral movable part 38 is similarly configured of optical members each including the prism 10, rod 20, and light pipe 18 on the side of the incidence end surfaces of the light pipes 18. Additionally, with respect to the third stage of the LED chip 26, the optical members each including the prism 10 and rod 20 are disposed on the side of the incidence end surfaces of the light pipes 18 in the second stage. Since the second and third stages are configured in this manner, the light from the LED chips 26 of the second and third stages can be mixed and used as a second light source.

In the illumination apparatus configured in this manner, the integral movable part 38 attached to a rotatable holding tool (not shown) is rotated in an arrow direction by a rotary motor (not shown). Moreover, for each stage, the LED chips 26 which are a plurality of light sources arranged on the inner periphery of the substrate formed in the annular shape are successively lit with the rotation of the integral movable part 38. That is, the plurality of LED chips 26 are successively switched to emit pulse light, and a relative positional relation with respect to the incidence end surface of the integral movable part 38 into which the radiated light is taken is selected and changed with the switching of the emission of the LED chips 26. In this manner, in one rotation of the integral movable part 38, the colors of the emitted light are switched in order of red (R), blue (B), green (G), red (R), blue (B), and green (G), and three colors of LEDs having effectively high luminance are obtained. That is, a large quantity of light of three colors whose parallelism has been enhanced is obtained from the emission end surface of the tapered rod 40 which is the emission end surface of the integral movable part 38.

It is to be noted that the incidence end surface of the tapered rod 40 is rectangular in accordance with the shape of the emission plane 16 of the prism 10, and the emission end surface is similarly rectangular. However, the emission end surface may also have any shape other than the rectangular shape, such as an octagonal shape.

FIG. 11 is a diagram showing a modification of the illumination apparatus of FIG. 10. FIG. 11A is a section looking in the direction of arrows 11A—11A of the of FIG. 11, and FIG. 11B is a section looking in the direction of arrows 11B—11B in FIG. 11. In the modification, the light sources are configured in two stages, and the arrangement of the LED package 24 is shifted from that in the adjacent stage by a half pitch. With the arrangement by the half pitch, when the lighting of the LED chips in one stage is switched during the successive lighting, the LED chip of the other stage is securely lit. Therefore, fluctuations of brightness can be suppressed as compared with simultaneous switching.

Figure 12:
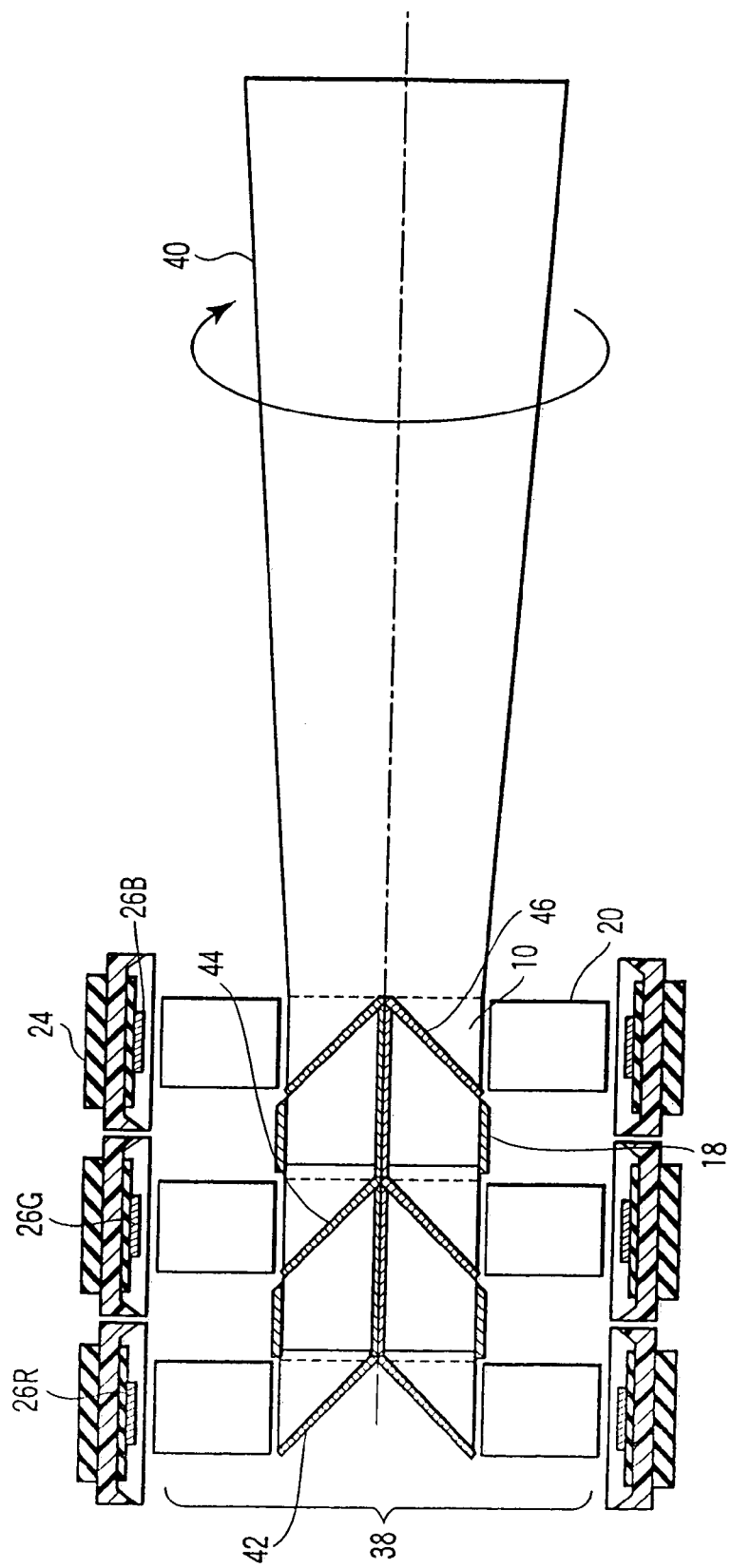
FIG. 12 is a diagram showing a configuration of another modification of the illumination apparatus according to the third embodiment.

FIG. 12 is a diagram showing another modification of the illumination apparatus of FIG. 10. In the modification, in the LED chips arranged in three stages, the LED chips having the same emission color are arranged in each stage. Moreover, on the first incidence plane 12 of the prism 10 of each stage, a mirror coat (film) or a dichroic mirror coat (film) is formed which has transmission or reflection properties determined by a wavelength band of the emission color of the LED chip. That is, in FIG. 12, the LED chips 26R having a red (R) emission color are disposed in a left stage, and a mirror coat 42 which reflects light in a wavelength band of the red (R) color is formed on the first incidence plane of the corresponding prism 10 as shown in parentheses. In a middle stage, the LED chips 26G having a green (G) emission color are disposed, and a dichroic mirror coat 44 which transmits the light of the wavelength band of the red (R) color and which reflects the light of the wavelength band of the green (G) color is formed on the first incidence plane of the corresponding prism 10. Moreover, in a right stage, the LED chips 26B having a blue (B) emission color are disposed, and a dichroic mirror coat 46 which transmits the light of the wavelength band of the red (R) and green (G) colors and which reflects the light of the wavelength band of the blue (B) color is formed on the first incidence plane of the corresponding prism 10. The dichroic mirror plane is formed in this manner, and therefore, among the light incident upon the second incidence plane 14, the ray having an incident angle which does not satisfy the total reflection conditions can be reflected by the first incidence plane 12.

It is to be noted that the prism 10 having a triangular sectional shape as shown in FIG. 12 may also be replaced with a cubic dichroic prism 48 as shown in FIG. 13. As shown, the dichroic mirror coats (film) 44 and 46 having the transmission or reflection properties are formed on diagonal surfaces of the dichroic prism 48. The wavelength band of the light transmitted or reflected by each of the dichroic mirror coats (film) 44 and 46 is determined by the wavelength band of the emission color of the corresponding LED chip. Furthermore, unlike the modification shown in FIG. 12, the second incidence plane 14 is also coated with dichroic mirror coats 50 and 52. When the R, G, and B LED chips are configured as shown, the shown dichroic mirror coats 44, 46, 50, and 52 have wavelength selection properties as shown in parentheses.

The prism 10 on the left end of the figure is a triangular prism coated with the high-efficiency mirror coat 42, but the cubic dichroic prism may also be used. In this case, the diagonal dichroic mirror coat may have properties for reflecting the light of the incident color (wavelength band) (properties that the light of the red (R) color is reflected in FIG. 13).

The dichroic prism 48 will be described with reference to FIG. 13 and FIG. 13A, which is an enlarged view showing the prism and its vicinity. When the light incident upon the second incidence plane 14 is blue, the dichroic mirror coat 50 of the second incidence plane 14 transmits blue (B), and reflects the light of the other colors. The dichroic mirror coat 46 of the first incidence plane 12 transmit the light of red (R) and green incident upon the first incidence plane as such, and reflects the blue light incident upon the second incidence plane 14 to emit light in a predetermined direction as shown. The red (R) and green (G) light which has entered the first incidence plane 12 and which strikes on the second incidence plane 14 is reflected to emit the light in the predetermined direction as shown.

By the configuration of FIG. 13, in the light incident upon the second incidence plane 14, the light having an incident angle which does not satisfy the total reflection conditions in the first incidence plane 12 can also be reflected, guided in the predetermined direction, and emitted. Similarly, in the light incident upon the first incidence plane 12, the light having an incident angle which does not satisfy the total reflection conditions in the second incidence plane 14 can also be reflected, guided in the predetermined direction, and emitted.

Here, even in the configuration of the triangular prism of FIG. 12, both the first incidence plane 12 and the second incidence plane 14 may also be coated with the dichroic mirror coat having properties similar to those in FIG. 13. It is to be noted that in the configuration of the triangular prism of FIG. 12 or the cubic configuration of FIG. 13, the dichroic mirror coat having the properties described with reference to FIG. 13 may not be formed on the first and second incidence planes, and may also be formed on only the first incidence plane 12 or only the second incidence plane 14.

Furthermore, the light guiding member which connects the triangular prism 10 to two dichroic prisms 48 is not necessarily limited to the hollow light pipe 18, and solid glass or plastic rod may also be used. In the dichroic prism 48, the surfaces other than the first incidence plane 12, second incidence plane 14, and emission plane 16 may also be coated with a reflective coating having a high reflectance to prevent leakage light.

To impart an effect similar to the above-described effect, needless to say, the application of the dichroic prism 48 or the dichroic mirror coat to the following embodiments of FIGS. 14 to 18 is considered. Since the dichroic mirror coat has dependence on the incident angle, it is also considered as effective that the light entering the dichroic prism 48 should have an optical configuration having NA reduced to a certain degree as shown in FIGS. 5 and 6.

FIG. 14 is a diagram showing still another modification of the illumination apparatus of FIG. 10. In the modification, the inclined rod 20 described in the second embodiment is used.

FIG. 15 shows a modification of the configuration of FIG. 14. That is, in the configuration of FIG. 14, each LED package 24 is obliquely mounted on a substrate (not shown).

On the other hand, in the modification, the light source is configured as a light-emitting unit 54 in which a light pipe 56 for guiding light toward the rod 20 from the LED chip 26 is assembled with the LED package 24. In this case, the light-emitting surfaces of the LED chips 26 have a mutually parallel positional relation.

Moreover, by the light-emitting unit 54 using the light pipe 56, the arrangement of the light source shown in FIG. 16 is also possible.

[Fourth Embodiment]

As shown in FIG. 17, in an illumination apparatus according to a fourth embodiment, the LED package 24 is disposed on a disc-shaped LED mounting substrate 58. In this case, the LED packages 24 are arranged on two concentric circles. Each LED package 24 is configured as the light-emitting unit 54 integrated with a tapered light pipe 60. The integral movable part 38 is configured of the above-described prism 10, the light pipe 18, the prism 32 coated with the mirror coat 36, and a rotary light guiding unit 62. In the rotary light guiding unit 62, the parallel rods connected to the emission plane 16 of the prism 10 are connected to a reflective prism to form one light guiding member, and the member forms a set together with another facing similar light guiding member. Emission ports of two light guiding members are combined, configured in substantially the same area as that of the incidence port of the single tapered rod, bonded, and integrated.

Even by the illumination apparatus configured in this manner, an effect similar to that of the illumination apparatus described in the third embodiment can be produced.

FIG. 18 is a diagram showing a modification of the illumination apparatus according to the fourth embodiment. In the modification, the tapered light pipe 30 functioning as a luminous flux splitting member for splitting the ray into two luminous fluxes as described with reference to FIG. 6 is used in the configuration of FIG. 17, and accordingly the light-emitting unit 54 is disposed only one circumference.

[Fifth Embodiment]

In a projection apparatus in which a light-modulating element (display panel) such as a liquid crystal device is illuminated by an illumination apparatus to project/display a light-modulated image on a screen by an optical projection system, to miniaturize the apparatus, each section corresponding the apparatus needs to be miniaturized. On the other hand, as in the third embodiment, the NA of an illuminative light of the illumination apparatus is reduced/converted using the tapered rod 40, and it is accordingly possible to enhance a light use efficiency in the display panel. Here, when the area of the emission end is enlarged with respect to that of the incidence end of the tapered rod 40, NA conversion efficiency is raised. However, the enlarging of the emission end area produces a minus effect from the standpoint of miniaturization. To solve the problem, in the present embodiment, the optical device of the present invention is configured on the emission end side of the tapered rod 40, not on the incidence end side, and accordingly the area of the emission end can be reduced without dropping the NA conversion efficiency of the tapered rod 40.

That is, in the illumination apparatus according to the present embodiment, as shown in FIGS. 19A to 19D, the prism 10 is disposed in such a manner that the ray emitted from the emission end of the tapered rod 40 enters the first incidence plane to cover about the half of the emission end of the tapered rod 40 and that the ray emitted from the other half of the emission end of the tapered rod 40 enters the second incidence plane while its light path is bent by a prism 64. In this case, as described in the first embodiment, an air layer 66 is disposed between the emission plane of the prism 64 and the second incidence plane of the prism 10. a reflective pipe 68 is disposed as a light guiding member which guides the ray emitted from the emission end of the tapered rod 40 onto the first incidence plane of the prism 10.

It is to be noted that the reflective surface of the prism 64 may be coated with a mirror coat 70 as shown in FIG. 20 to securely reflect all the incident rays.

FIG. 19B is a sectional view looking in the direction of arrows 19B—19B of FIG. 19A.

On the other hand, the incidence end side of the tapered rod 40 is configured in such a manner that the rays emitted from the integral movable part 38 enter the end. That is, in the integral movable part 38 in the present embodiment, the rod 20 which takes the diffused light from the LED chips 26 arranged in the ring form (donut type), and a prism 72 which directs the diffused light taken in this manner toward the incidence end of the tapered rod 40 form one set, and two sets are supported and configured by a rod supporting portion 74. The integral movable part 38 is rotated by a rotary motor 76. Since the integral movable part 38 is configured separately from the tapered rod 40, the tapered rod 40 does not rotate as in the third embodiment, and therefore the position of the emission plane of the prism 10 is also fixed. Therefore, an illuminated position by the illuminative light is also unchanged. When display device is disposed in the illuminated position, the projection apparatus can easily be configured.

FIGS. 21 and 22 are ray tracing diagrams in the above-described configuration. As shown in these figures, the rays emitted independently of one another from a plurality of LED chips 26 are mixed in the integral movable part 38, the NA is reduced/converted by the tapered rod 40, and the rays are split into two luminous fluxes. Moreover, the ray of the second luminous flux emitted from a part of the emission end surface of the tapered rod 40 is reflected by the prism 64 to enter the second incidence plane of the prism 10, reflected by the first incidence plane of the prism 10, and emitted from the emission plane of the prism 10. The ray of the first luminous flux emitted from other parts of the tapered rod 40 enters the first incidence plane of the prism 10, is reflected by the second incidence plane of the prism 10, and is emitted from the emission plane of the prism 10.

Therefore, a large quantity of light can be effectively obtained from the emitted light having a large NA in the diffusing surface emission. Moreover, the obtained light is converted to the illuminative light having a small NA, and synthesized without increasing the NA of the illuminative light, and an emission area of the illuminative light can be reduced. Therefore, a small display panel is usable, and the optical system of the projection apparatus can be miniaturized.

FIG. 23 is a diagram showing a modification of the illumination apparatus according to the present embodiment. That is, the tapered rod 40 is configured of two tapered rods 40A and 40B having the emission end surfaces corresponding to the prism 10 and the prism 64. In this configuration, since the air layer 66 exists between the tapered rods 40A and 40B, the rays incident upon the tapered rods 40A and 40B can be securely guided into the corresponding prisms 10 and 64. It is to be noted that the tapered rods 40A and 40B are preferably mirror-coated, so that the rays that do not satisfy the total reflection conditions can also be securely guided.

It is to be noted that, as shown in FIGS. 24 and 24A, assuming that a height of the prism 10 or 64 is b, and a width of the gap (air layer 66) is c, the emission end of the tapered rod 40 has a height of 2b+c. On the other hand, an aspect ratio a:b of the emission plane of the prism 10 is preferably set to be equal to that of the display device which is a device to be illuminated from the standpoint of the light use efficiency. Therefore, the size of the emission end of the tapered rod 40 is preferably determined in order to obtain the aspect ratio a:b.

Also in the modification shown in FIG. 23, as shown in FIGS. 25 and 25A, the sizes of the emission ends of the respective tapered rods 40A and 40B are similarly preferably determined.

Figure 26:
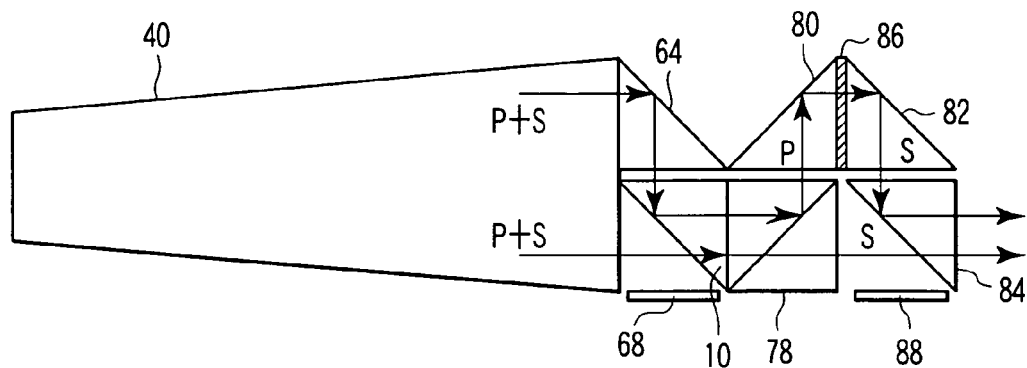
FIG. 26 is a diagram showing a configuration of another modification of the illumination apparatus in the fifth embodiment.

FIG. 26 is a diagram showing another modification. That is, when the liquid crystal device is used as the display device illuminated by the illumination apparatus, polarized light of the illuminative light needs to be aligned. On the other hand, illuminative light including P-polarized light and S-polarized light (shown as P+S in the drawing) is emitted from the illumination apparatus. Therefore, on the emission plane side of the prism 10, an optical system configured of a polarized beam splitter (PBS) 78, prisms 80, 82, and 84, a λ/2 plate 86, and a reflective pipe 88 is disposed to align the polarized light.

That is, the PBS 78 disposed on a plane before the emission plane of the prism 10 is configured to transmit the S-polarized light and to reflect the P-polarized light. Therefore, in the rays of P+S emitted from the emission plane of the prism 10, the S-polarized light is transmitted through the PBS 78, guided in the reflective pipe 88 to enter the first incidence plane of the prism 84, and emitted from the emission end. On the other hand, the P-polarized light is reflected by the PBS 78, and further reflected by the prism 80 to enter the λ/2 plate 86. The P-polarized light is converted to the S-polarized light by the λ/2 plate 86. Moreover, the S-polarized light is reflected by the prism 82 to enter the second incidence plane of the prism 84, reflected by the first incidence plane, and emitted from the emission plane. In this manner, the illuminative light converted to the S-polarized light is emitted from the emission plane of the prism 84.

It is to be noted that, needless to say, the reflective coats may also be formed on the reflective surfaces of the prisms 80 and 82 in the same manner as in the prism 64.

FIGS. 27, 27A, 27B, and 27C show still another modification. In this modification, a configuration similar to that of the optical system configured of the prisms 10 and 64 and the reflective pipe 68 to convolute an emission end size of the illumination apparatus into about ½ opening size is disposed on the emission plane of the prism 10. In this manner, the emission end size of the illumination apparatus is convoluted further by about ½, that is, to the opening size which is about ¼ of the size of the emission end of the tapered rod 40. That is, in the modification, prisms 90 and 92, and a reflective pipe 94 are disposed on the emission plane of the prism 10. Here, the ray emitted from about the half of the emission plane of the prism 10 is guided by the reflective pipe 94 to enter the prism 90, and emitted from an emission plane 96. The rays emitted from the other half of the emission plane of the prism 10 are reflected by the prism 92 to enter the prism 90, reflected by the prism 90, and emitted from the emission plane 96. By this configuration, the area of the emission plane 96 can further be reduced.

Moreover, also in this case, needless to say, the reflective coat may also be formed on the reflective surface of the prism 92 in the same manner as in the prism 64.

[Sixth Embodiment]

As shown in FIG. 28, in the illumination apparatus according to the present embodiment, two prisms 10, the light pipe 18, and three tapered rods 20 form one set, two sets are used to constitute the integral movable part 38, and the tapered rod 40 is further formed on the emission side of the part.

That is, the diffused light from the LED chip 26 in the LED package 24 is emitted in a radiating direction. Then, in the present embodiment, each rod 20 is tapered, the emission end of the rod is directed toward the LED package 24 and disposed, and the diffused light from the LED chip 26 is enclosed from three directions and taken in. By the configuration, the light use efficiency can be raised.

[Seventh Embodiment]

In the third and fourth embodiments, a structure configured of the tapered rod 40, prism 10, and rod 20 is used as the rotatable integral movable part 38. The part does not have to be necessarily rotated as long as a desired quantity of light emitted from the tapered rod 40 can be obtained without rotating the part. an example in which the part is not rotated will be described as a seventh embodiment.

Figure 29B:
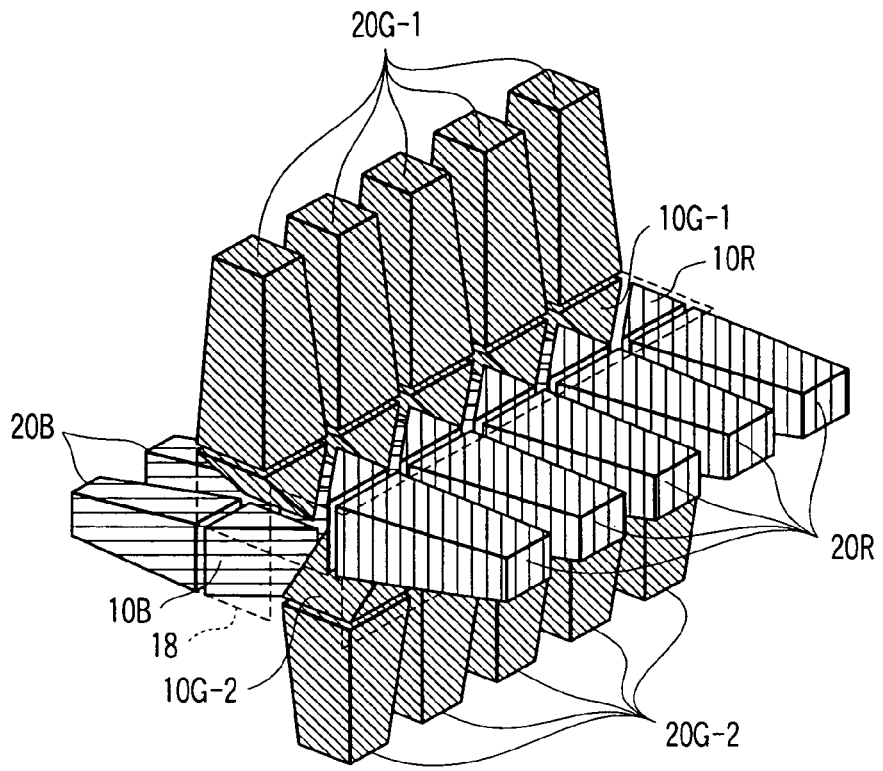
FIG. 29B is an explanatory view of an arrangement of the tapered rod and prism.

FIGS. 29, 29A and 29B are diagrams showing a configuration of the seventh embodiment. It is to be noted that to facilitate the understanding of the structure, some of wall surfaces of the light pipes are omitted in FIGS. 29 and 29A. In FIG. 29B, to facilitate the understanding of the arranged structure of the prism, the LED package and the tapered rod are omitted, and edge lines of the light pipes are shown by broken lines. Further in FIG. 29B, hatching is used in order to easily distinguish four directions from one another (i.e., the hatching does not show any section).

That is, one set is constitute of the LED package 24 integrally configured with an optical light-condensing element 98 which condenses the diffused light toward the emission end of the rod 20, the tapered rod 20, and the prism 10, four sets are arranged in each stage, and five stages are configured to allow the rays from the LED packages 24 to enter one tapered rod 40. In this case, each of four LED packages 24 arranged in each stage is disposed in each of four directions. It is assumed that five LED packages in each direction (row) emit the light of the same color. That is, in FIG. 29A, five LED packages 24G (G11 to G15) of the green (G) emission color are arranged in an upper row. By each tapered rod 20 (tapered rod 20G-1), the diffused light of the green (G) color is applied into the first incidence plane of the corresponding prism 10 (prism 10G-1), and reflected by the second incidence plane to enter the tapered rod 40 or the second incidence plane of the prism 10G-1 of the previous stage. Also in a lower row, five LED packages 24G (G21 to G25) of the green (G) emission color are similarly arranged. By each tapered rod 20 (tapered rod 20G-2), the diffused light of the green (G) color is applied into the first incidence plane of the corresponding prism 10 (prism 10G-2), and reflected by the second incidence plane to enter the tapered rod 40 or the second incidence plane of the prism 10G-2 of the previous stage. In a right or left row, five LED packages 24R of the red (R) emission color (R1 to R5) are arranged. By each tapered rod 20 (tapered rod 20R), the diffused light of the red (R) color is applied into the first incidence plane of the corresponding prism 10 (prism 10R), and reflected by the second incidence plane to enter the tapered rod 40 or the second incidence plane of the prism 10R of the previous stage. Moreover, in the remaining right or left row, five LED packages 24B of the blue (B) color (B1 to B5) are arranged. By each tapered rod 20 (tapered rod 20B), the diffused light of the blue (B) color is applied into the first incidence plane of the corresponding prism 10 (prism 10B), and reflected by the second incidence plane to enter the tapered rod 40 or the second incidence plane of the prism 10B of the previous stage. It is to be noted that the light is guided by the light pipe 18 between the prisms.

Here, to mix three colors RGB to obtain a white illuminative light as a total, many green (G) color components are required. Therefore, only the LED packages 24G of the green (G) emission color are arranged in two rows to obtain more quantity of light. It is to be noted that in the present embodiment, the LED packages 24G of the green (G) emission color are arranged in the directions facing each other, but may also be arranged adjacent to one another.

Figure 30:
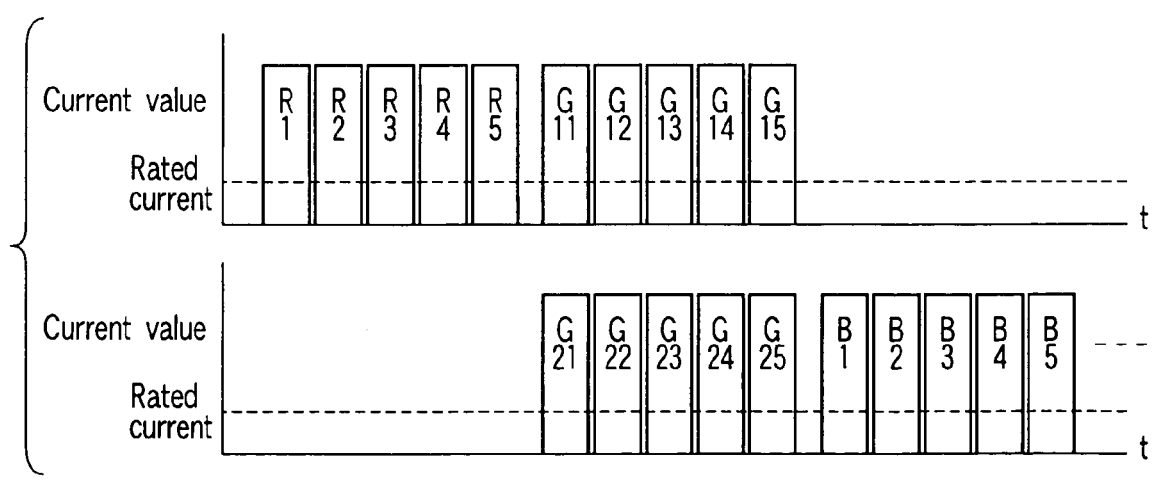
FIG. 30 is a timing chart showing a lighting sequence of the illumination apparatus according to the seventh embodiment.

Each LED package 24 is controlled to light by a light source control section 100 as shown in FIG. 30. That is, first the LED packages 24R of the red (R) emission color are pulse-lit by a driving current value which is larger than a rated current in order from R1 to R5. Next, the LED packages 24G of the green (G) emission color are similarly pulse-lit every two packages in order from G11 and G21 to G15 and G25. Moreover, the LED packages 24B of the blue (B) emission color are similarly pulse-lit in order from B1 to B5. This is regarded as one period, and is repeatedly performed a length of one period may be set, for example, in accordance with one frame of a video signal displayed in the display device illuminated by the illumination apparatus, or may be set in accordance with the application of the illumination apparatus.

It is to be noted that all the respective LED packages 24 may also be configured of white emission color.

Figures 31, 31A:
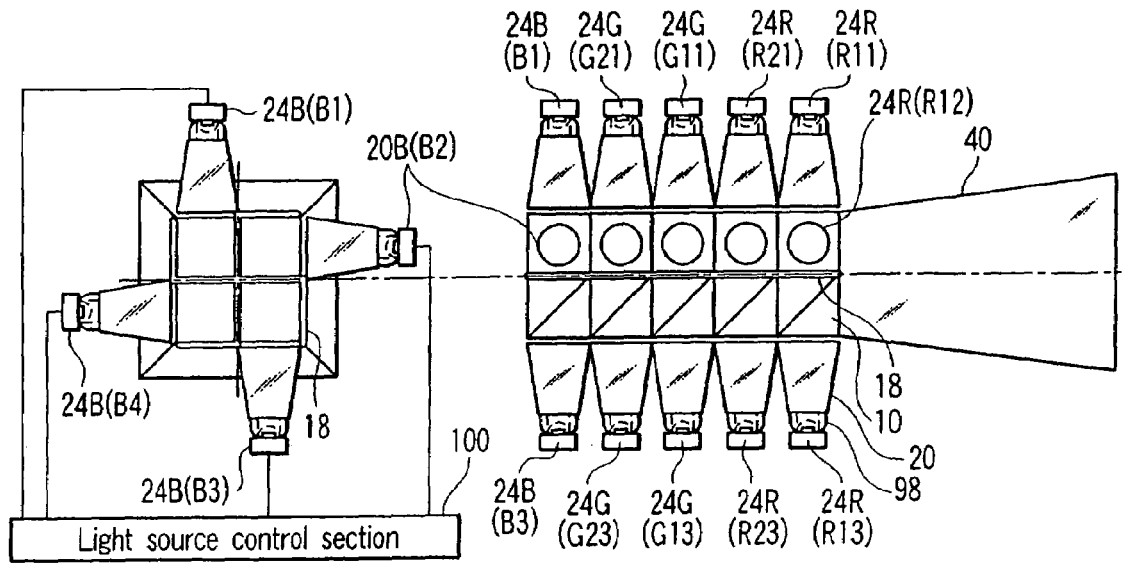
FIG. 31 is a front plan view showing a configuration of a modificaton of the illumination apparatus according to the seventh embodiment.
FIG. 31A is a side plan view of the illumination apparatus of FIG. 31.

FIGS. 31 and 31A are diagrams showing a configuration of a modification of the illumination apparatus according to the seventh embodiment. To easily understand the structure, some of the wall surfaces of the light pipes are omitted in the drawing. In the modification, the arrangement of RGB is changed. That is, four LED packages 24R (R11 to R14) of the red (R) emission color are arranged in a first stage, four LED packages 24R (R21 to R24) of the red (R) emission color are arranged in a second stage, four LED packages 24G (G11 to G14) of the green (G) emission color are arranged in a third stage, four LED packages 24G (G21 to G24) of the green (G) emission color are arranged in a fourth stage, and four LED packages 24B (B1 to B4) of the blue (B) emission color are arranged in a fifth stage.

Figure 32:
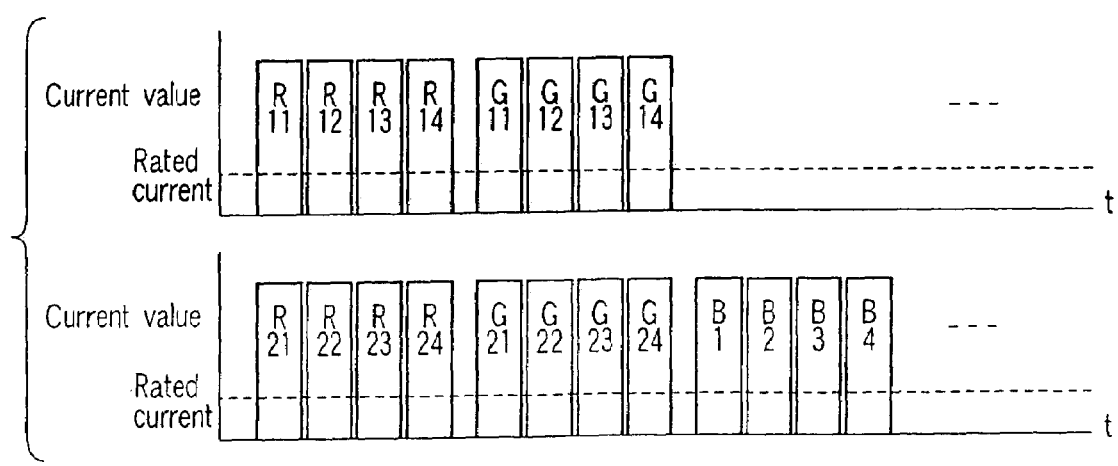
FIG. 32 is a timing chart showing the lighting sequence in a modification of FIG. 31.

In this case, the light source control section 100 performs an emission control as shown in FIG. 32. That is, first the LED packages 24R of the red (R) emission color are pulse-lit by a driving current value which is larger than a rated current in order from R11 to R14, and simultaneously the LED packages 24R of the red (R) emission color are pulse-lit in order from R21 to R24. In this case, a timing is adjusted in such a manner that two LED packages 24R are simultaneously lit. Next, similarly the LED packages 24G of the green (G) emission color are similarly pulse-lit every two packages in order from G11 and G21 to G14 and G24. Moreover, the LED packages 24B of the blue (B) emission color are similarly pulse-lit in order from B1 to B4. This is regarded as one period, and is repeatedly performed. The length of one period may be set in accordance with the application of the illumination apparatus.

Even in this modification, all the LED packages 24 may also be configured of the white emission color.

It is to be noted that also in the configuration of FIG. 12 described above, the plurality of LED chips arranged in three stages are successively switched to pulse-light in a timing similar to that shown in FIG. 32. In the same manner as in FIG. 10, the relative positional relation with the emission end surface of the integral movable part 38 which takes in the radiated light is selected and changed in accordance with the emission switching of the LED packages 24 (LED chips 26). Accordingly, needless to say, the color of the emitted light is switched in order of the red (R), green (G), and blue (B) colors in the process of the rotation of the integral movable part 38.

Figure 33A:
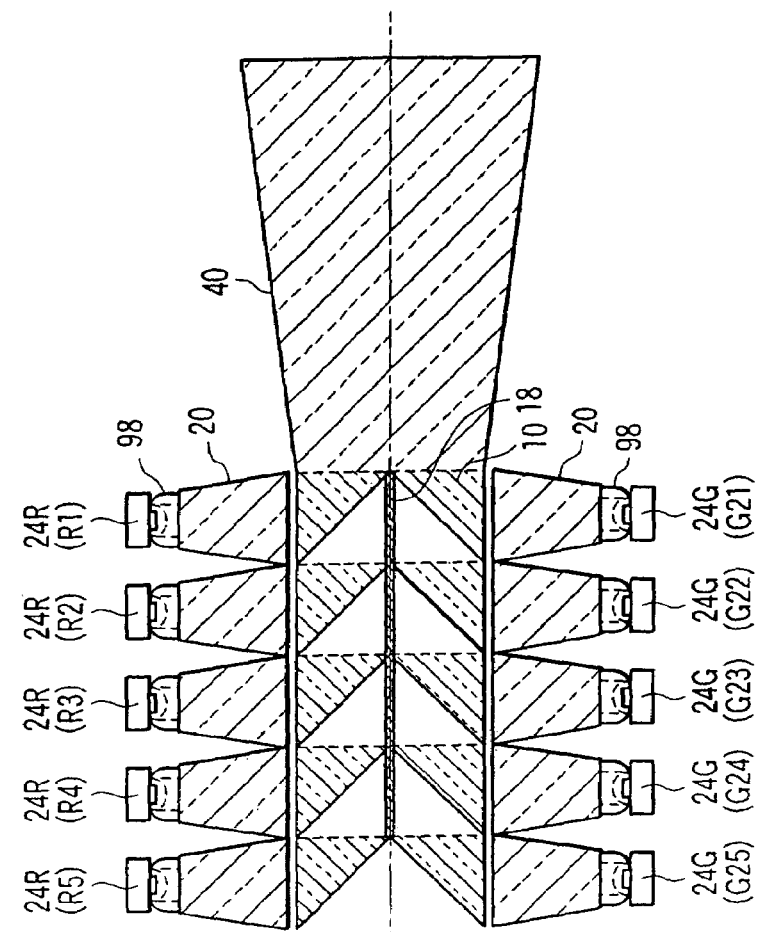
FIG. 33A is a sectional view looking in the direction of line 33A—33A in FIG. 33.
Figure 33:
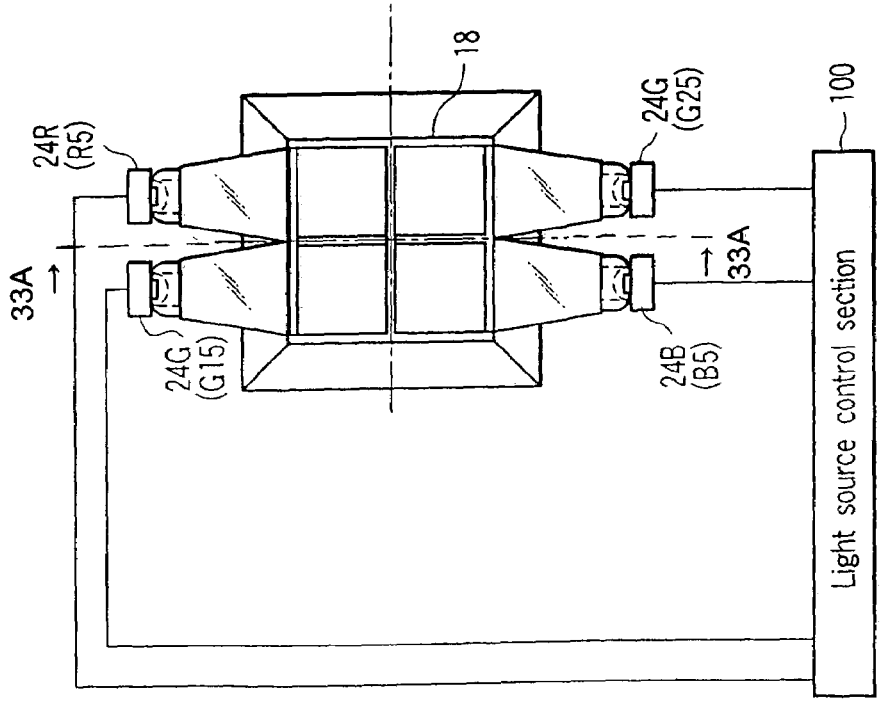
FIG. 33 is a front plan view showing a configuration of another modification of the illumination apparatus according to the seventh embodiment.

FIGS. 33 and 33A are diagrams showing a configuration of another modification of the present embodiment. Also in the drawing, to easily understand the structure, some of the wall surfaces of the light pipes are omitted. In the modification, the LED packages 24 are arranged every two rows in upper and lower parts. That is, five LED packages 24R (R1 to R5) of the red (R) emission color are arranged in an upper first row, and five LED packages 24G (G11 to G15) of the green (G) emission color are arranged in the upper second row. Five LED packages 24G (G21 to G25) of the green (G) emission color are arranged in a lower first row, and five LED packages 24B (B1 to B5) of the blue (B) emission color are arranged in the lower second row.

In this configuration, the light source control section 100 performs the lighting control as shown in FIG. 30 described above.

FIGS. 34 and 34A are diagrams showing a configuration of still another modification of the present embodiment. In the modification, in the same manner as in the modification shown in FIG. 33, the LED packages 24 are arranged every two rows in the upper and lower parts. The emission colors are arranged in the same manner as in the modification shown in FIG. 31. That is, four LED packages 24R (R11 to R14, R21 to R24) of the red (R) color are arranged in each of the first and second stages, four LED packages 24G (G11 to G14, G21 to G24) of the green (G) color are arranged in each of the third and fourth stages, and four LED packages 24B (B1 to B4) of the blue (B) color are arranged in the fifth stage.

Moreover, in the first to fourth stages, instead of the prism 10, the cubic dichroic prism 48 described in the modification of FIG. 13 in the third embodiment is used. In this case, in the dichroic prisms 48 in the first and second stages, dichroic mirror coats 102 which transmit the light of the green (G) and blue (B) colors and which reflect the light of the red (R) color are diagonally disposed. In the dichroic prisms 48 in the third and fourth stages, dichroic mirror coats 104 which transmit the light of the blue (B) color and which reflect the light of the green (G) color are diagonally disposed. On the other hand, in the prism 10 of the fifth stage, mirror coats 106 which reflect the light of the blue (B) color are formed on the reflective surfaces. Highly-reflective plates 108 are disposed between the upper and lower dichroic prisms 48.

Figure 35:
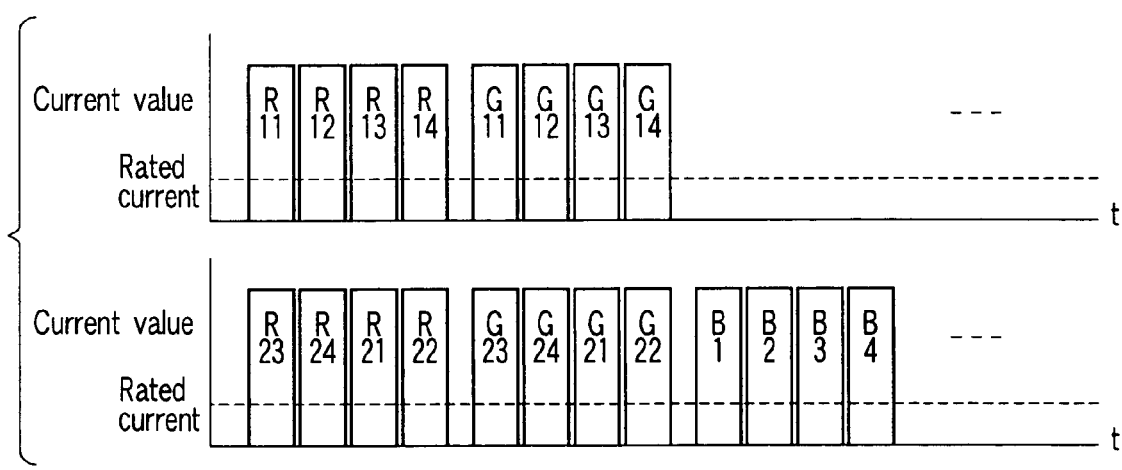
FIG. 35 is a timing chart showing the lighting sequence in a modification of FIG. 34.
Figure 27B:
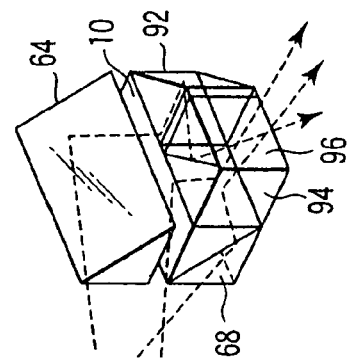
FIG. 27B is a perspective view of the emission end of the illumination apparatus shown in FIGS. 27 and 27A.
Figure 27C:
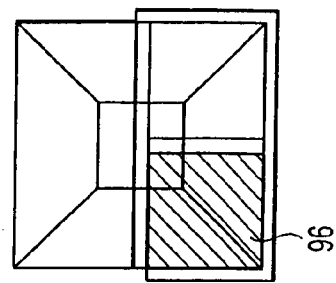
FIG. 27C is a side view of the emission end of the illumination apparatus shown in FIGS. 27 and 27A.
Figure 27:
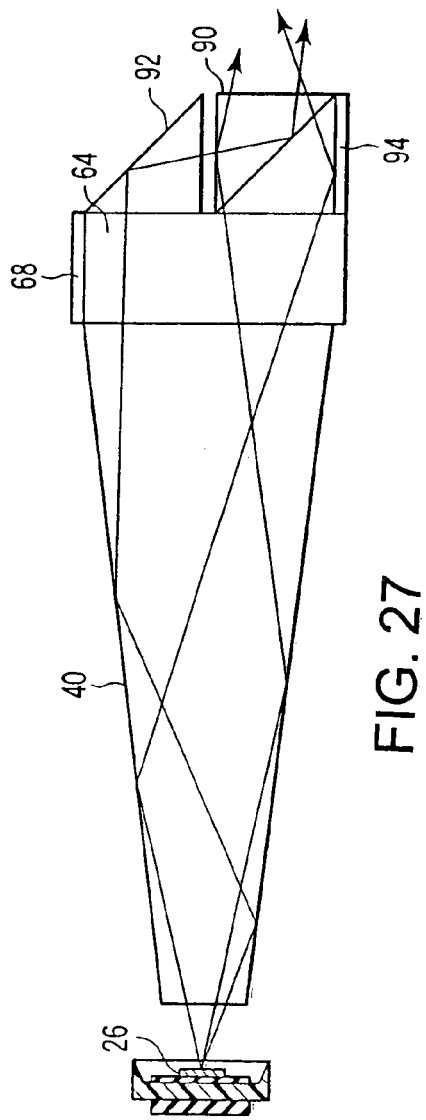
FIG. 27 is a top plan view of a configuration of still another modification of the illumination apparatus in the fifth embodiment.
Figure 27A:
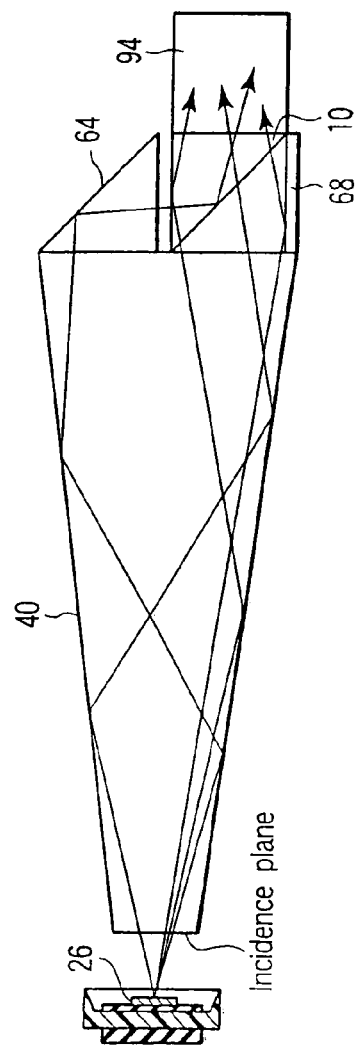
FIG. 27A is a front view of the illumination apparatus shown in FIG. 27.

FIG. 35 is a diagram showing a sequence of emission control in the light source control section 100 in the configuration. That is, first the LED packages 24R of the red (R) emission color are pulse-lit with a driving current value which is larger than the rated current in order from R11 to R14, and simultaneously the LED packages 24 of the red (R) emission color are pulse-lit in order of R23, R24, R21 and R22. In this case, the timing is adjusted to simultaneously light two LED packages 24R. Next, similarly, the LED packages 24G of the green (G) color are similarly pulse-lit every two packages in order of G11 and G23, G12 and G24, G13 and G21, G14 and G22. Moreover, the LED packages 24B of the blue (B) emission color are similarly pulse-lit in order from B1 to B4. This is regarded as one period, and is repeatedly performed. The length of one period may be set in accordance with the application of the illumination apparatus.

The present invention has been described above based on the embodiments, but is not limited to the above-described embodiments, and can be, needless to say, variously modified or applied within the scope of the present invention. For example, the incidence end surface of the rod 20 of the integral movable part 38 may also be shaped to be curved in accordance with a rotation radius. In this case, the incidence end surface can be brought closer to the LED chip 26.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An illumination apparatus comprising:
   a first light source configured to emit a diffused light;
   a second light source configured to emit a diffused light; and
   an optical device including;
      a first incidence plane configured to enter rays emitted from the first light source;
      a second incidence plane configured to enter rays emitted from the second light source, the rays entering the first incidence plane being reflected by the second incidence plane, the rays entering the second incidence plane being reflected by the first incidence plane; and
      an emission plane configured to mix the rays reflected by the first and second incidence planes and to emit the mixed rays in a predetermined direction;
   wherein the first and second light sources have light-emitting surfaces which emit diffused light, and the light-emitting surfaces are disposed in a mutually parallel positional relation; and
   wherein the first and second light sources are mounted on the same substrate, and are parallel to each other with respect to the light-emitting surfaces.

2. A color illumination apparatus comprising:
   a plurality of illumination apparatuses each including;
      a first light source configured to emit a diffused light;
      a second light source configured to emit a diffused light;
      a first incidence plane configured to enter rays emitted from the first light source;
      a second incidence plane configured to enter rays emitted from the second light source, the rays entering the first incidence plane being reflected by the second incidence plane, the rays entering the second incidence plane being reflected by the first incidence plane; and
      an emission plane configured to mix the rays reflected by the first and second incidence planes and to emit the mixed rays in a predetermined direction; and
   a light source control section configured to drive and control the first and second light sources of the plurality of illumination apparatuses,
   wherein the first and second light sources configuring one of the plurality of illumination apparatuses emit a diffused light of a first color which is the same color,
   the first and second light sources configuring the other illumination apparatus in the plurality of illumination apparatuses emit a diffused light of a second color which is the same color, the second color being different from the first color, and
   the light source control section drives and controls the first and second light sources configuring the one illumination apparatus and the other illumination apparatus in such a manner that the color of the color illuminative light is switched to the first and second colors in a time series.

3. The color illumination apparatus according to claim 2, wherein the light source control section drives and controls the first and second light sources configuring the one illumination apparatus and the other illumination apparatus in such a manner that a quantity of illuminative light emitted from the plurality of illumination apparatuses per unit time is constant.

4. An illumination apparatus comprising:
   a light source configured to emit rays;
   a luminous flux splitting member configured to split the rays emitted from the light source into two luminous fluxes; and
   an optical device including;
      a first incidence plane configured to enter rays of the first luminous flux split by the luminous flux splitting member;
      a second incidence plane configured to enter rays of the second luminous flux split by the luminous flux splitting member, the rays entering the first incidence plane being reflected by the second incidence plane, the rays entering the second incidence plane being reflected by the first incidence plane; and
      an emission plane configured to mix the rays reflected by the first and second incidence planes and to emit the mixed rays in a predetermined direction;
   wherein the light source includes:
      a plurality of light-emitting members configured to emit rays independently of one another; and
      an optical member conflaured to guide the rays emitted from the plurality of light-emittin& members into an incidence end surface of the luminous flux splitting member, wherein
      the luminous flux splitting member splits the rays emitted from the plurality of light-emitting members and the rays are mixed by the optical member into two luminous fluxes;
   wherein the luminous flux splitting member includes:
      a rod configured in a tapered shape in which an area of an emission end surface is larger than that of an incidence end surface; and
      a reflective surface configured to guide the rays emitted from a part of the emission end surface of the rod into the second incidence plane, wherein
      the rays emitted from other parts of the emission end surface of the rod enter the first incidence plane as such.

5. The illumination apparatus according to claim 4, wherein the rod configured in the tapered shape is configured of two rods having emission end surfaces disposed facing the reflective surface and the first incidence plane.

6. A color illumination apparatus comprising:
   a plurality of illumination apparatuses each including:
      first light source means for emitting a diffused light;
      second light source means for emitting a diffused light;
      a first incidence means for entering rays emitted from the first light source means;
      a second incidence means for entering rays emitted from the second light source means, the rays entering the first incidence means being reflected by the second incidence means, the rays entering the second incidence means being reflected by the first incidence means; and an emission means for mixing the rays reflected by the first and second incidence means and for emitting the mixed rays in a predetermined direction; and light source control means for driving and controlling the first and second light source means of the plurality of illumination apparatuses, wherein the first and second light source means configuring one of the plurality of illumination apparatuses emit a diffused light of a first color which is the same color, the first and second light source means configuring the other illumination apparatus in the plurality of illumination apparatuses emit a diffused light of a second color being different from the first color, the light source control means drives and controls the first and second light source means configuring the one illumination apparatus and the other illumination apparatus in such a manner that the color of the color illuminative light is switched to the first and second colors in a time series.

* * * * *